(12) United States Patent
Kiyokami

(10) Patent No.: US 11,073,235 B2
(45) Date of Patent: Jul. 27, 2021

(54) RESIN PIPING ASSEMBLY, AND PROCESS OF FORMING THE SAME

(71) Applicant: TOYOTA JIDOSHA KABUSHIKI KAISHA, Toyota (JP)

(72) Inventor: Hiroaki Kiyokami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/390,052

(22) Filed: Apr. 22, 2019

(65) Prior Publication Data

US 2019/0323642 A1 Oct. 24, 2019

(30) Foreign Application Priority Data

Apr. 20, 2018 (JP) .............................. JP2018-081682

(51) Int. Cl.
*F16L 9/00* (2006.01)
*F16L 47/02* (2006.01)
(Continued)

(52) U.S. Cl.
CPC .......... *F16L 47/02* (2013.01); *B29C 45/0053* (2013.01); *B29C 65/06* (2013.01);
(Continued)

(58) Field of Classification Search
CPC .......... F16L 9/12; F16L 47/02; B29C 66/547; B29L 2023/22
(Continued)

(56) References Cited

U.S. PATENT DOCUMENTS 1,638,428 A * 8/1927 Zander .................... E01F 5/005
138/157
2,262,627 A * 11/1941 Whitesell, Jr. ...... F01N 13/1805
285/288.1
(Continued)

FOREIGN PATENT DOCUMENTS

CA          2589854 C      2/2014
CN        107249861 A     10/2017
(Continued)

OTHER PUBLICATIONS

U.S. Appl. No. 17/336,990 filed Jun. 2, 2021, inventor: Hiroaki Kiyokami.

*Primary Examiner* — James F Hook
(74) *Attorney, Agent, or Firm* — Oliff PLC

(57) ABSTRACT

A resin piping assembly including a base divisional component having first and second half components having respective first and second interfacial surfaces formed along an oil passage, and first and second divisional components which have respective third and fourth interfacial surfaces formed along the oil passage, and which are bonded to the respective first and second half components. Each of the base divisional component, and the first and second divisional components is formed of a resin material, and the first and second interfacial surfaces are spaced apart from each other, and open in respective opposite directions. The base divisional component further includes a cylindrical connecting pipe portion having a connecting passage portion which is a part of the oil passage and which is provided for communication between the first and second passage portions. Also disclosed is a process of forming the resin piping assembly.

6 Claims, 9 Drawing Sheets

(51) Int. Cl.
- *B29C 45/00* (2006.01)
- *B29C 65/06* (2006.01)
- *B29C 65/00* (2006.01)
- *F16L 9/12* (2006.01)
- *B29L 23/00* (2006.01)

(52) U.S. Cl.
CPC .............. *B29C 66/547* (2013.01); *F16L 9/12* (2013.01); *B29L 2023/22* (2013.01)

(58) Field of Classification Search
USPC ........ 138/157, 158, 160, 167, 169, 170, 171
See application file for complete search history.

(56) References Cited

U.S. PATENT DOCUMENTS

| | | | | |
|---|---|---|---|---|
| 2,736,451 | A * | 2/1956 | Fogg | H02G 3/088 220/3.8 |
| 5,992,369 | A * | 11/1999 | Mehne | F02M 35/112 123/184.21 |
| 6,247,500 | B1 * | 6/2001 | McMahon | F16L 9/22 138/157 |
| 7,156,126 | B2 | 1/2007 | Topek et al. | |
| 7,451,541 | B2 * | 11/2008 | Stastny | F16L 9/17 138/157 |
| 2008/0023095 | A1 * | 1/2008 | Burrows | A47L 15/4219 138/158 |
| 2016/0025205 | A1 | 1/2016 | Smith et al. | |
| 2017/0361541 | A1 | 12/2017 | Ueno et al. | |
| 2019/0017590 | A1 * | 1/2019 | Kidokoro | F16K 27/04 |
| 2019/0024808 | A1 | 1/2019 | Kidokoro et al. | |

FOREIGN PATENT DOCUMENTS

| | | |
|---|---|---|
| EP | 3272503 A1 | 1/2018 |
| JP | H07-080938 A | 3/1995 |
| JP | H11-147265 A | 6/1999 |
| JP | 2012-127480 A | 7/2012 |
| JP | 2014-009744 A | 1/2014 |
| JP | 2014-152758 A | 8/2014 |
| WO | 2017/146263 A1 | 8/2017 |

* cited by examiner

FIG.1

RESIN PIPING ASSEMBLY, AND PROCESS OF FORMING THE SAME

This application claims priority from Japanese Patent Application No. 2018-081682 filed on Apr. 20, 2018, the disclosure of which is herein incorporated by reference in its entirety.

FIELD OF THE INVENTION

The present invention relates to a resin piping assembly, and a process of forming the resin piping assembly, and more particularly to techniques relating to a resin piping assembly including a plurality of divisional components bonded together so as to form an oil passage with a high degree of freedom of design of configuration of the oil passage, while ensuring a high degree of bonding of the divisional components.

BACKGROUND OF THE INVENTION

There is known a resin piping assembly including a plurality of divisional components which cooperate to define a circumference of an oil passage along a length of the oil passage and which are bonded together with their interfacial surfaces being held in contact with each other. JP2014-9744A discloses an example of this type of resin piping assembly, and JP7-80938A discloses a vibration welding process in which the plurality of divisional components are pressed for pressing contact of their interfacial surfaces with each other while the divisional components are vibrated such that their interfacial surfaces are kept in pressing sliding contact with each other, whereby these interfacial surfaces are welded together due to generated friction heat.

SUMMARY OF THE INVENTION

By the way, where the divisional components are bonded together in the vibration welding process while the divisional components are pressed for pressing contact of their interfacial surfaces with each other, the interfacial surfaces are preferably perpendicular to the direction of pressing of the divisional components against each other. Where the oil passage of the resin piping assembly is three-dimensional, however, the interfacial surfaces are accordingly three-dimensional, so that there is a risk of failure to bond together the divisional components with a sufficient strength of bonding, due to local areas of the interfacial surfaces to which a desired pressing force cannot be applied. Namely, a desired pressing force in a direction perpendicular to the interfacial surfaces can be adequately applied to an entire area of each interfacial surface, where the divisional components cooperate to define the circumference of the oil passage in cross section in a plane parallel to the two-dimensional plane of the two-dimensional oil passage. Where the oil passage is three-dimensional, on the other hand, the interfacial surfaces have local areas inclined with respect to the two-dimensional plane perpendicular to the direction of application of the pressing force. If an angle of inclination of the local areas increases, the pressing force in the direction perpendicular to the inclined local areas is undesirably reduced, so that the permissible three-dimensional configuration of the oil passage is limited due to an upper limit of the angle of inclination permissible to obtain the pressing force required to adequately bond together the divisional components. The thus limited configuration of the oil passage will be hereinafter referred to as "limited three-dimensional configuration".

The present invention was made in view of the background art described above. It is therefore an object of the present invention to provide a resin piping assembly including a plurality of divisional components bonded together so as to form an oil passage with a high degree of freedom of design of configuration of the oil passage, while ensuring a high degree of bonding of the divisional components. Another object of the invention is to provide a process of forming such a resin piping assembly.

The object indicated above is achieved according to the following modes of the present invention:

According to a first mode of the invention, there is provided a resin piping assembly having an oil passage, comprising: a base divisional component including a first half component having a first interfacial surface formed along the oil passage, and a second half component having a second interfacial surface formed along the oil passage; a first divisional component having a third interfacial surface formed along the oil passage, and bonded to the first half component with the first and third interfacial surfaces being held in contact with each other, so as to form a first passage portion of the oil passage; and a second divisional component having a fourth interfacial surface formed along the oil passage, and bonded to the second half component with the second and fourth interfacial surfaces being held in contact with each other, so as to form a second passage portion of the oil passage. Each of the base divisional component, the first divisional component and the second divisional component is formed of a resin material, and the first and second interfacial surfaces are spaced apart from each other along a length of the oil passage, and open in respective opposite directions. The base divisional component further includes a cylindrical connecting pipe portion having a connecting passage portion which is a part of the oil passage and which is provided for communication between the first and second passage portions.

According to a second mode of the invention, the resin piping assembly according to the first mode of the invention is configured such that the first interfacial surface of the first half component has a groove at least partially defining the first passage portion, and the second interfacial surface of the second half component has a groove at least partially defining the second passage portion. Further, the connecting pipe portion linearly extends along a straight line, and the first and second half components are spaced apart from each other in a direction parallel to the straight line. The grooves of the first and second interfacial surfaces are open in respective opposite directions parallel to the straight line, and the first and second half components extend from the connecting pipe portion in respective opposite directions perpendicular to the straight line.

According to a third mode of the invention, the resin piping assembly according to the first or second mode of the invention is configured such that at least one of the base divisional component and the first and second divisional components is provided with a plurality of integrally formed hollow nozzle portions each extending in a direction opposite to a direction in which a groove formed in the interfacial surface of the above-indicated at least one divisional component is open. Each of the hollow nozzle portions has a delivery nozzle which is open externally of the hollow nozzle portion.

According to a fourth mode of the invention, the resin piping assembly according to the third mode of the invention is configured such that the connecting pipe portion linearly extends, and the base divisional component is provided with the hollow nozzle portions such that the hollow nozzle portions linearly extend parallel to a direction of extension of the cylindrical connecting pipe portion.

According to a fifth mode of the invention, the resin piping assembly according to any one of the first through fourth modes of the invention is configured such that the connecting pipe portion linearly extends, and the first half component of the base divisional component is provided with an integrally formed cylindrical connector port such that the connector port linearly extends parallel to a direction of extension of the connecting pipe portion, in a direction opposite to a direction in which a groove formed in the first interfacial surface is open.

According to a sixth mode of the invention, the resin piping assembly according to any one of the first through fifth modes of the invention delivers a lubricant oil to predetermined lubricated portions of a power transmitting system. The lubricant oil can be used not only to lubricate those predetermined lubricated portions for preventing or reducing degrees of their friction and wearing, but also to cool predetermined heat-generating portions of the power transmitting system. Therefore, the predetermined lubricated portions may be the heat-generating portions that should be cooled, as well as the portions which are subjected to friction and should be lubricated.

According to a seventh mode of the invention, there is provided a process of forming a resin piping assembly having an oil passage and comprising: a base divisional component including a first half component having a first interfacial surface formed along the oil passage, and a second half component having a second interfacial surface formed along the oil passage; a first divisional component having a third interfacial surface formed along the oil passage, and bonded to the first half component with the first and third interfacial surfaces being held in contact with each other, so as to form a first passage portion of the oil passage; and a second divisional component having a fourth interfacial surface formed along the oil passage, and bonded to the second half component with the second and fourth interfacial surfaces being held in contact with each other, so as to form a second passage portion of the oil passage, wherein each of the base divisional component, the first divisional component and the second divisional component is formed of a resin material, and the first and second interfacial surfaces are spaced apart from each other along a length of the oil passage, and open in respective opposite directions, the base divisional component further including a cylindrical connecting pipe portion having a connecting passage portion which is a part of the oil passage and which is provided for communication between the first and second passage portions, the process comprising: a forming step to form the base divisional component, the first divisional component and the second divisional component by an injection molding process, respectively; a first bonding step to bond the first divisional component to the first half component of the base divisional component, by pressing contact of the first interfacial surface of the first half component with the third interfacial surface of the first divisional component; and a second bonding step to bond the second divisional component to the second half component of the base divisional component, by pressing contact of the second interfacial surface of the second half component with the fourth interfacial surface of the second divisional component.

According to an eighth mode of the invention, the process according to the seventh mode of the invention is arranged such that the first bonding step includes a vibration welding step in which the first interfacial surface of the first half component and the third interfacial surface of the first divisional component are held in pressing sliding contact with each other, while the second bonding step includes a vibration welding step in which the second interfacial surface of the second half component and the fourth interfacial surface of the second divisional component are held in pressing sliding contact with each other. The divisional components are bonded together in a vibration welding operation in which the divisional components are subjected to vibration and welding due to friction heat generated by the vibration, while the divisional components are pressed against each other. However, the divisional components may be bonded together while they are pressed against each other during their vibration after their interfacial surfaces are heated by exposure to infrared rays.

According to a ninth mode of the invention, the process according to the seventh or eighth mode of the invention is adapted to the resin piping assembly wherein the first interfacial surface of the first half component has a groove partially defining the first passage portion, while the second interfacial surface of the second half component has a groove partially defining the second passage portion, and the connecting pipe portion linearly extends along a straight line, and the first and second half components are spaced apart from each other in a direction parallel to the straight line, the grooves of the first and second interfacial surfaces being open in respective opposite directions parallel to the straight line, and the first and second half components extending from the connecting pipe portion in respective opposite directions perpendicular to the straight line. The process of forming the resin piping assembly according to the ninth mode of the invention is arranged such that the forming step is implemented to form the base divisional component integrally with the first and second half components having the respective grooves, and the connecting pipe portion, by the injection molding process, by using a molding device having a pair of forming molds which are movable toward and away from each other in the direction parallel to the straight line.

According to a tenth mode of the invention, the process according to the ninth mode of the invention is adapted to the resin piping assembly wherein the second half component of the base divisional component is provided with a plurality of hollow nozzle portions each linearly extending in a direction of the straight line and a direction opposite to a direction in which the groove formed in the second interfacial surface is open, each of the hollow nozzle portions having a delivery nozzle which is open externally of the hollow nozzle portion. The process of forming the resin piping assembly according to the tenth mode of the invention is arranged such that the forming step is implemented to form the base divisional component integrally with the hollow nozzle portions, by the injection molding process with the molding device.

According to an eleventh mode of the invention, the process according to the ninth or tenth mode of the invention is adapted to the resin piping assembly wherein the first half component of the base divisional component is provided with a cylindrical connector port linearly extending in a direction of the straight line and a direction opposite to a direction in which the groove formed in the first interfacial surface is open. The process of forming the resin piping assembly according to the eleventh mode of the invention is arranged such that the forming step is implemented to form the base divisional component integrally with the cylindrical connector port, by the injection molding process with the molding device.

In the resin piping assembly according to the first mode of the invention, the resin piping assembly comprises the base divisional component including the first and second half components connected to each other through the connecting pipe portion, and the first and second divisional components cooperating with the respective first and second half components to form the respective first and second passage portions of the oil passage. For bonding the first and second divisional components to the respective first and second half components by pressing contact of the first and third interfacial surfaces with each other, and by pressing contact of the second and fourth interfacial surfaces with each other, each of those first through fourth interfacial surfaces is required to have a two-dimensional configuration or a limited three-dimensional configuration, so that a desired pressing force can be applied to an entire area of each of the interfacial surfaces. Accordingly, each of the first and second passage portions is also required to have a two-dimensional configuration or a limited three-dimensional configuration. In the resin piping assembly according to the present first mode of the invention, however, the configurations of the first and second passage portions can be designed independently of each other, so as to permit application of the desired pressing force to the entire area of each interfacial surface. Further, the first and second passage portions are spaced apart from each other and are held in communication with each other through the connecting pipe portion, so that the resin piping assembly has a high degree of freedom of design of configuration of the oil passage including the connecting passage portion. Accordingly, the present resin piping assembly can be formed to have a comparatively complicated three-dimensional configuration while ensuring a high degree of bonding of the first and second divisional components to the first and second half components of the base divisional component.

Where the first and second divisional components are bonded to the respective first and second half components with an adhesive agent being applied to their interfacial surfaces, for instance, it is not required to apply a large pressing force to the interfacial surfaces. In this case, the configurations of the interfacial surfaces have a high degree of freedom of design, so that there is a reduced limitation regarding the configurations of the first and second passage portions, whereby the resin piping assembly has a high degree of freedom of design of configuration of the oil passage as a whole, as well as a desired strength of bonding of the first and second divisional components to the respective first and second half components. Thus, the resin piping assembly according to the first mode of the invention does not necessarily require application of a large pressing force to the interfacial surfaces for their mutual bonding.

In the resin piping assembly according to the second mode of the invention, the first and second interfacial surfaces of the first and second half components have the respective grooves, and the connecting pipe portion linearly extends along the straight line. Further, the first and second half components are spaced apart from each other in the direction parallel to the straight line, and the grooves of the first and second interfacial surfaces are open in the respective opposite directions parallel to the straight line. The first and second half components extend from the connecting pipe portion in the respective opposite directions perpendicular to the straight line. Accordingly, the base divisional component including the first and second half components and the connecting pipe portion can be formed as a one-piece body with the first and second interfacial surfaces having the respective grooves, by an injection molding process or a press-forming process, for example, by using a molding device provided with a pair of forming molds which are movable toward and away from each other in the direction parallel to the above-indicated straight line. Thus, the base divisional component can be easily and economically formed.

In the resin piping assembly according to the third mode of the invention, at least one of the base divisional component and the first and second divisional components is provided with the plurality of integrally formed hollow nozzle portions each extending in the direction opposite to the direction in which the groove formed in the interfacial surface of the above-indicated at least one divisional component is open. The hollow nozzle portions permit extension of the oil passage, without reducing the strength of bonding of the first and second divisional components to the base divisional component. Further, the hollow nozzle portions formed integrally with the above-indicated at least one divisional component permit economical manufacture of the resin piping assembly with a reduced number of parts, than where separately formed nozzles are fixed to a resin piping assembly with screws or any other fastening members.

In the resin piping assembly according to the fourth mode of the invention, the connecting pipe portion linearly extends, and the base divisional component is provided with the hollow nozzle portions such that the hollow nozzle portions linearly extend parallel to the direction of extension of the cylindrical connecting pipe portion. Accordingly, the base divisional component including the connecting pipe portion and the hollow nozzle portions can be formed as a one-piece body, by an injection molding process or a press-forming process, for example, by using a molding device provided with a pair of forming molds which are movable toward and away from each other in the direction parallel to the above-indicated straight line. Thus, the base divisional component can be easily and economically formed.

In the resin piping assembly according to the fifth mode of the invention, the connecting pipe portion linearly extends, and the first half component of the base divisional component is provided with the integrally formed cylindrical connector port such that the connector port linearly extends parallel to the direction of extension of the connecting pipe portion, in the direction opposite to the direction in which the groove formed in the first interfacial surface is open. Accordingly, the cylindrical connector port can be formed, without reducing the strength of bonding of the first divisional component to the first half component of the base divisional component. Further, the cylindrical connector port formed integrally with the base divisional component permits economical manufacture of the resin piping assembly with a reduced number of parts, than where a separately formed connector port is fixed to a resin piping assembly with screws or any other fastening members. In addition, since the connector port is formed so as to extend along the straight line parallel to the direction of extension of the connecting pipe portion, the base divisional component including the connecting pipe portion and the connector port can be formed as a one-piece body, by an injection molding process or a press-forming process, for example, by using a molding device provided with a pair of forming molds which are movable toward and away from each other in the direction parallel to the above-indicated straight line. Thus, the base divisional component can be easily and economically formed.

The resin piping assembly according to the sixth mode of the invention delivers the lubricant oil to the predetermined lubricated portions of the power transmitting system. Since the resin piping assembly has a high degree of freedom of design of configuration of the oil passage, the resin piping assembly can be compactly disposed in a complicated narrow space within a casing of the power transmitting system, and can deliver the lubricant oil exactly to the predetermined lubricated portions of the power transmitting system, in a pin-pointing manner.

In the process according to the seventh mode of the invention, the base divisional component, the first divisional component and the second divisional component are formed by the injection molding process, respectively, and the first and second divisional components are bonded to the respective first and second half components of the base divisional component, by pressing the first and second divisional components against the respective first and second half components. Accordingly, the present process has substantially the same advantages as the resin piping assembly according to the first mode of the invention.

In the process according to the eighth mode of the invention, each of the first bonding step to bond the first divisional component to the first half component of the base divisional component, and the second bonding step to bond the second divisional component to the second half component of the base divisional component is implemented by a vibration welding step wherein a desired pressing force should be applied to an entire area of each of the first through fourth interfacial surfaces, for ensuring a required strength of bonding of the first and second divisional components to the respective first and second half components. Since all of the interfacial surfaces have two-dimensional or limited three-dimensional configurations, the desired pressing force can be applied to the entire area of each interfacial surface in the vibration welding process, whereby the first and second divisional components can be adequately bonded to the respective first and second half components of the base divisional component.

The process according to the ninth mode of the invention is adapted to the resin piping assembly wherein the first and second interfacial surfaces of the first and second half components have the respective grooves partially defining the respective first and second passage portions, and the first and second half components are spaced apart from each other in the direction parallel to the direction of extension of the connecting pipe portion. The grooves are open in the respective opposite directions parallel to the direction of extension of the connecting pipe portion, and the first and second half components extend from the connecting pipe portion in the respective opposite directions perpendicular to the direction of extension of the connecting pipe portion. According to this ninth mode of the invention, the process of forming the resin piping assembly is arranged such that the forming step is implemented to form the base divisional component integrally with the first and second half components having the respective grooves, and the connecting pipe portion, by the injection molding process, by using the molding device having the pair of forming molds which are movable toward and away from each other in the direction parallel to the direction of extension of the connecting pipe portion. Accordingly, the base divisional component having the hollow nozzle portions can be easily and economically formed. The molding device need not be provided with a sliding mold movable in the direction perpendicular to the direction of extension of the connecting pipe portion, so that the molding device can be economically manufactured with a comparatively simple structure.

The process according to the tenth mode of the invention is adapted to the resin piping assembly wherein the second half component of the base divisional component is provided with the plurality of hollow nozzle portions each linearly extending in the direction of the straight line and the direction opposite to the direction in which the groove formed in the second interfacial surface is open, and each of the hollow nozzle portions has the delivery nozzle which is open externally of the hollow nozzle portion. The process of forming the resin piping assembly according to the tenth mode of the invention is arranged such that the forming step is implemented to form the base divisional component integrally with the hollow nozzle portions, by the injection molding process with the molding device. Accordingly, the base divisional component with the hollow nozzle portions can be easily and economically formed. The process according to the eleventh mode of the invention is adapted to the resin piping assembly wherein the first half component of the base divisional component is provided with the cylindrical connector port linearly extending in the direction of the straight line and the direction opposite to the direction in which the groove formed in the first interfacial surface is open. The process of forming the resin piping assembly according to the eleventh mode of the invention is arranged such that the forming step is implemented to form the base divisional component integrally with the connector port, by the injection molding process with the molding device. Accordingly, the base divisional component with the connector port can be easily and economically formed.

BRIEF DESCRIPTION OF THE DRAWINGS

FIG. 1 is a schematic view showing an arrangement of a power transmitting system of a hybrid vehicle, which is provided with a lubricating device including an oil piping assembly (resin piping assembly) according to one embodiment of the invention;

DETAILED DESCRIPTION OF PREFERRED EMBODIMENTS

Figure 2:
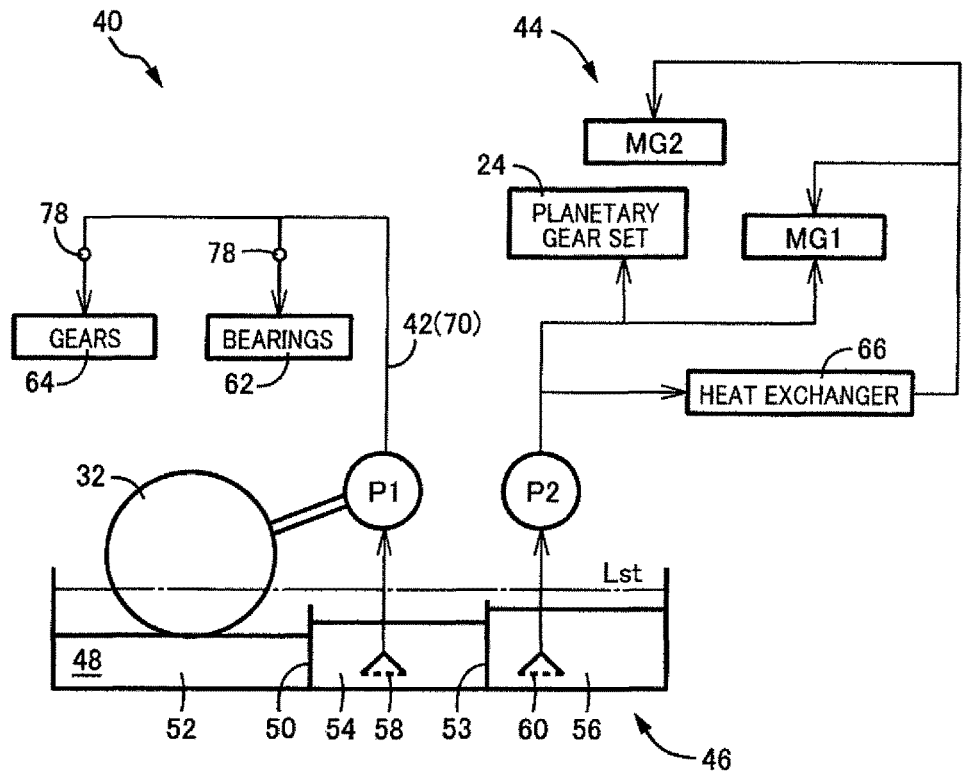
FIG. 2 is a hydraulic circuit diagram illustrating the lubricating device of the power transmitting system shown in FIG. 1.

The resin piping assembly according to the present invention is suitably applicable to a lubricating device of a power transmitting system of a vehicle, for delivering the lubricant oil to predetermined lubricated portions of the power transmitting system. However, the present resin piping assembly is equally applicable to a lubricating device of a power transmitting system other than the vehicular power transmitting system. Further, the present resin piping assembly may be used for various other purposes, for example, for delivering a fluid such as water other than the lubricant oil. Examples of the lubricated portions of the power transmitting system include: power transmitting gears meshing with each other; a transmission belt; bearings rotatably supporting rotary shafts of the power transmitting system; and mutually frictionally contacting portions and heat generating portions of electric motors and generators of hybrid or electric vehicles, which are required to be lubricated or cooled during power transmission. The resin piping assembly according to the present invention may be used to deliver the lubricant oil from the oil pump directly to the predetermined lubricated portions, but may be used to deliver the lubricant oil to any other portions or for any other purposes, for instance, to deliver the lubricant oil to an oil cooler or any other heat exchanging device, or to hydraulic switching valves and hydraulic pressure control valves, or to deliver the lubricant oil from the oil cooler or any other heat exchanging device, or from the hydraulic switching valves or hydraulic pressure control valves, to the lubricated portions.

While the resin piping assembly is basically formed of a synthetic resin material, reinforcing metallic members may be embedded in the resin piping assembly, by an insert-forming process. Further, the resin piping assembly including at least three divisional components consisting of the base divisional component and the first and second divisional components may consist of four or more divisional components formed integrally with each other. For instance, the second divisional component may consist of two half components, like the base divisional component. In this case, the resin piping assembly includes four divisional components consisting of the base divisional component, the first divisional component, and the two half components of the second divisional component. Alternatively, the base divisional component may include three half components consisting of the above-indicated first and second half components, and a third half component connected to the second half component through another connecting pipe portion. In this case, a third divisional component is bonded to the third half component of the base divisional component. The oil passage formed through the resin piping assembly may have a comparatively simple two-dimensional crank configuration consisting of the first passage portion, the second passage portion each extending linearly, and the connecting passage portion connected at its opposite ends to the first and second passage portions such that the connecting passage portion is perpendicular to the first and second passage portions. Alternatively, the oil passage including the first and second passage portions may have a limited three-dimensional configuration which permits the divisional components of the resin piping assembly to be adequately bonded together with a required pressing force. The limited three-dimensional configuration is preferably designed such that a permissible upper limit of an angle of inclination of the first and second passage portions with respect to a plane perpendicular to the direction of application of the pressing force is 60°, desirably 45°, where the first and second divisional components are bonded to the base divisional component by a welding process. The permissible upper limit of the angle of inclination may be suitably determined depending upon the specific process or manner of bonding of the plurality of divisional components. Although the divisional components are preferably bonded together by the welding process in which synthetic resin materials of the divisional components are pressed and melted due to friction or heat, the divisional components may be bonded together with an adhesive agent while a pressing force is applied to the divisional components. While the principle of the process of forming the resin piping assembly according to the present invention requires the first and second divisional components to be bonded to the base divisional component with pressing contact of their interfacial surfaces with each other, the resin piping assembly per se according to the present invention does not require application of a pressing force to the interfacial surfaces of the divisional components during their mutual bonding.

The first and second half components of the base divisional component may be formed so as to suitably determine two directions in which the respective third and fourth interfacial surfaces of the first and second divisional components are pressed against the respective first and second interfacial surfaces of the first and second divisional components along a straight line. For instance, the above-indicated two directions are opposite to each other, or perpendicular to each other. Irrespective of these two directions with respect to each other, the base divisional component can be formed as a one-piece body by injection molding, by using a molding device provided with three or more molds which are movable in two or more directions (along two or more axes). Where the two directions are opposite to each other, while the connecting pipe portion linearly extends along a straight line, the connecting pipe portion can be formed during an injection molding process to form the base divisional component. However, the connecting pipe portion, and the connecting passage portion formed through the connecting pipe portion may be formed by machining operations, for instance, after the injection molding process. Further, the connecting pipe portion need not be formed so as to linear extend along a straight line.

At least one of the first interfacial surface of the first half component of the base divisional component and the third interfacial surface of the first divisional component has a groove (elongate recess) at least partially defining the first passage portion, and at least one of the second interfacial surface of the second half component of the base divisional component and the fourth interfacial surface of the second divisional component has a groove (elongate recess) at least partially defining the second passage portion. Namely, the first and third interfacial surfaces, and/or the second and fourth interfacial surfaces need not have two symmetrical semi-circular shapes in cross section in a plane perpendicular to a direction of extension of the oil passage (first or second passage portion), but may have respective different arcuate dimensions in the above-indicated cross section. For instance, the arcuate dimensions of the two interfacial surfaces to be bonded together may have a ratio of 1:2 or 1:3.

Further, one of the above-indicated two interfacial surfaces may have no groove, while only the other interfacial surface has a semi-circular, U-shaped or V-shaped groove, for example. The oil passage may have a circular, elliptical, triangular, quadrangular or any other polygonal, or any other cross sectional shape. The grooves are desirably formed in the interfacial surfaces during formation of the divisional components by injection molding, for instance, but may be formed by machining operations after the formation of the divisional components. The interfacial surface having the groove is considered to be defined by the periphery of an opening of the groove.

Each of the first and second passage portions of the oil passage is connected at its one end to the connecting pipe portion, for example, so that the first and second passage portions are connected to each other through the connecting pipe portion, such that the two passage portions extend from the connecting pipe portion in respective opposite directions. However, the connecting pipe portion may be connected to a longitudinally intermediate part of at least one of the first and second passage portions, so that the oil passage has a plurality of branch passage sections. The base divisional component and the first and second divisional components are provided with a plurality of integrally formed and outwardly extending hollow nozzle portions, and an integrally formed and cylindrical connector port, as needed, such that the hollow nozzle portions and connector port linear extend along straight lines parallel to the connecting pipe portion, in the direction opposite to the direction in which the grooves formed in the interfacial surfaces are open. However, the hollow nozzle portions and the connector port may be replaced by delivery nozzles and a connector fitting directly communicating with the first or second passage portion. The connector port may be provided to introduce a fluid into the resin piping assembly, or to deliver the fluid from the resin piping assembly. The delivery nozzles and the connector fitting may be formed during formation of the divisional components, by using a molding device including a sliding mold which is mechanically moved by a cam, in synchronization with a movement of a movable mold, for example. However, the delivery nozzles and the connector fitting may be formed by machining operations after the divisional components are formed. Passages formed through the hollow nozzle portions and a through-hole of the connector port may also be formed during formation of the divisional components by an injection molding process, for example. However, the passages and through-hole may be formed by machining operations after formation of the divisional components, and need not be formed so as to extend in the direction parallel to the direction of extension of the connecting pipe portion.

While the base divisional component and the first and second divisional components are preferably formed as a one-piece body by an injection molding process, these divisional components may be formed by a press forming process. Further, those divisional components may be subjected to machining or other operations after formation of the components. The first bonding step to bond the first divisional component to the first half component of the base divisional component, and the second bonding step to bond the second divisional component to the second half component of the base divisional component may be implemented in this order of description, or vice versa, or at the same time, if possible.

Preferred embodiments of the present invention will be described in detail by reference to the drawings. It is to be understood that the drawings are simplified and transformed as needed, and do not necessarily accurately represent dimensions and shapes of various elements of the embodiment.

Figure 1:
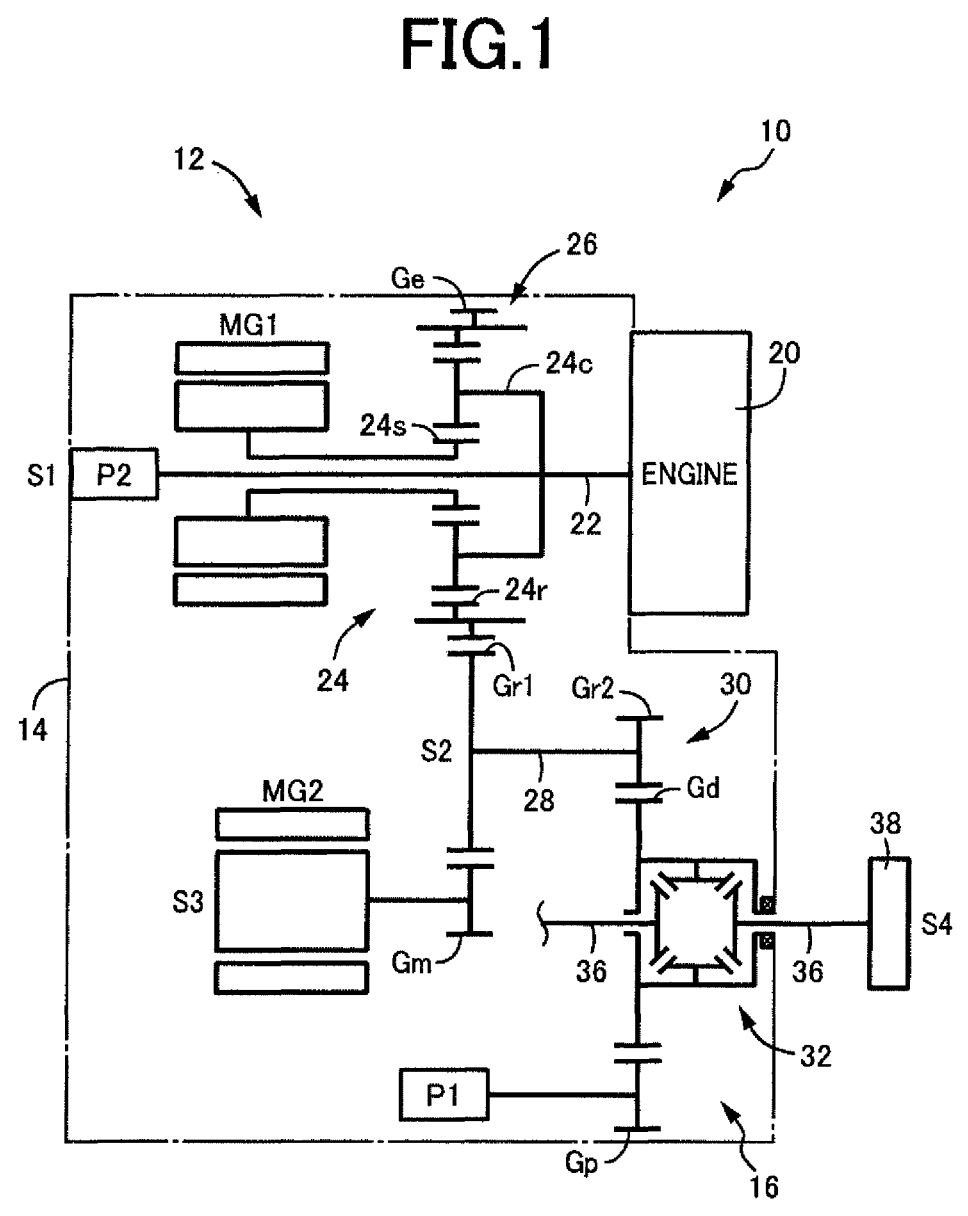

Reference is first made to FIG. 1, which is the schematic view showing an arrangement of a hybrid vehicle 10 including a transaxle 12 provided with a lubricating device 40 (described below by reference to FIG. 2) according to a first embodiment of this invention. The transaxle 12 includes a power transmitting mechanism 16 having a plurality of axes which are shown in a common plane of the view of FIG. 1. The transaxle 12 is configured to transmit an output of a drive power source in the form of an engine 20 to left and right drive wheels 38, and is of a transversely mounted type installed on the hybrid vehicle 10 of an FF type, for example, such that the plurality of axes of the power transmitting mechanism 16 of a gear type are parallel to a width or transverse direction of the hybrid vehicle 10. The power transmitting mechanism 16 is accommodated within a casing 14. The engine 20 is an internal combustion engine such as a gasoline or diesel engine, which generates a vehicle drive force by combustion of a fuel. The transaxle 12 is a power transmitting system, and the casing 14 consists of a plurality of members as needed.

The power transmitting mechanism 16 has first through fourth axes S1-S4 substantially parallel to the width direction of the hybrid vehicle 10. On the first axis S1, there are disposed: an input shaft 22 connected to the engine 20 functioning as the drive power source; a planetary gear set 24 of a single-pinion type; and a first motor/generator MG1. The planetary gear set 24 and the first motor/generator MG1 function as an electrically controlled differential portion 26. The planetary gear set 24 functions as a differential mechanism, and includes a carrier 24c connected to the input shaft 22, a sun gear 24s connected to the first motor/generator MG1, and a ring gear 24r provided with an engine output gear Ge. The carrier 24c, sun gear 24s and ring gear 24r respectively correspond to first, second and third rotary elements, while the first motor/generator MG1 corresponds to a differential control motor. The first motor/generator MG1 is operated selectively as an electric motor or an electric generator. When the first motor/generator MG1 is operated as the electric generator, a rotating speed of the sun gear 24s is continuously controlled by a regenerative control of the first motor/generator MG1, so that an operating speed of the engine 20 is continuously varied, and a rotary motion of the engine 20 is output from the engine output gear Ge. When the sun gear 24s is placed in a freely rotatable state with torque of the first motor/generator MG1 being zeroed, the engine 20 and the power transmitting mechanism 16 are disconnected from each other, so that dragging of the engine 20 by the power transmitting mechanism 16 is prevented.

On the second axis S2, there is disposed a speed reducing gear device 30 including a shaft 28 provided at opposite axial ends of the shaft 28 with a large-diameter speed reducing gear Gr1 and a small-diameter speed reducing gear Gr2. The large-diameter speed reducing gear Gr1 is held in meshing engagement with the engine output gear Ge, and a motor output gear Gm of a second motor/generator MG2 disposed on the third axis S3. The second motor/generator MG2 is operated selectively as an electric motor or an electric generator. The second motor/generator MG2 serves as a drive power source for driving the hybrid vehicle 10 when the second motor/generator MG2 is operated as the electric motor. Thus, the second motor/generator MG2 is operable as a vehicle driving electric motor.

The small-diameter speed reducing gear Gr2 is held in meshing engagement with a differential ring gear Gd of a differential gear device 32 disposed on the fourth axis S4, so that drive forces of the engine 20 and the second motor/generator MG2 are distributed to left and right drive shafts 36 through the differential gear device 32, and transmitted to the left and right drive wheels 38. The engine output gear Ge, the large-diameter speed reducing gear Gr1, the small-diameter speed reducing gear Gr2 and the differential ring gear Gd primarily constitute a gear mechanism. The fourth axis S4 of the first through fourth axes S1-S4 is the axis located at the lowest position in the hybrid vehicle 10, and a bottom portion of the casing 14 serves as an oil reservoir 46 storing an oil (lubricant oil) 48, as shown in FIG. 2, so that a lower portion of the differential gear device 32 is immersed in a bath of the oil 48.

The hybrid vehicle 10 constructed as described above is placed in a selected one of an EV (electric vehicle) drive mode and an HV (hybrid vehicle) drive mode, according to a drive mode switching map and on the basis of a required vehicle drive force (as represented by an operation amount of an accelerator pedal) and a running speed V of the hybrid vehicle 10, for example. In the EV drive mode, the hybrid vehicle 10 is driven with the second motor/generator MG2 operated as the drive power source, while the engine 20 is held at rest. This EV drive mode is selected when the required vehicle drive force is comparatively small, namely, the hybrid vehicle 10 is in a low-load running state. In the EV drive mode, a fuel supply to the engine 20 is stopped, and the torque of the first motor/generator MG1 is zeroed, so that the sun gear 24s of the planetary gear set 24 is freely rotatable, and the first motor/generator MG1 is held substantially at rest, even in a running state of the hybrid vehicle 10. In the HV drive mode, the hybrid vehicle 10 is driven with the engine 20 operated as the drive power source, while a regenerative operation of the first motor/generator MG1 is controlled. The HV drive mode is selected when the required vehicle drive force is comparatively large, namely, the hybrid vehicle 10 is in a high-load running state. In this HV drive mode, the second motor/generator MG2 is operated as the drive power source when generation of an assisting torque is required to accelerate the hybrid vehicle 10, for example, or is kept operated as the drive power source.

The hybrid vehicle 10 may be placed in an engine drive mode in place of the above-described HV drive mode, or as well as in the HV drive mode. In the engine drive mode, only the engine 20 is operated as the drive power source. Although the arrangement of the transaxle 12 of the hybrid vehicle 10 has been described for illustrative purpose only, the transaxle 12 may be constructed with various changes or modifications. For example, the planetary gear set 24 of the single-pinion type may be replaced by a planetary gear set of a double-pinion type, or a plurality of planetary gear sets. Further, the second motor/generator MG2 may be disposed on the first axis S1, and the electrically controlled differential portion 26 may be replaced by a mechanically operated transmission.

In the present embodiment of the invention, the transaxle 12 of the hybrid vehicle 10 is provided with the above-indicated lubricating device 40 shown in FIG. 2. The lubricating device 40 includes a first oil pump P1 and a second oil pump P2 as an oil pumping device. The first and second oil pumps P1 and P2 are connected to respective first and second oil supply passages 42 and 44 which are independent of each other, and which are assigned to respective groups of predetermined lubricated portions of the power transmitting mechanism 16. As shown in FIG. 1, the first oil pump P1 is a mechanical pump mechanically operated by a pump driving gear Gp held in meshing engagement with the differential ring gear Gd, while the second oil pump P2 is a mechanical pump mechanically operated by the engine 20 through the input shaft 22. The first oil pump P1 may be modified such that the pump driving gear Gp is held in meshing engagement with the large-diameter speed reducing gear Gr1 or the small-diameter speed reducing gear Gr2, which is rotated in synchronization with the differential ring gear Gd. The second oil pump P2 is an oil pump operated by a drive power source different from a vehicle drive force output portion in the form of the differential gear device 32, that is, an oil pump operated by the engine 20. However, the second oil pump P2 may be replaced by an electrically operated oil pump operated by an exclusive pump driving electric motor.

The first and second oil pumps P1 and P2 described above are configured to suck the oil 48 from the oil reservoir 46 located in the bottom portion of the casing 14, and to deliver the oil 48 through the first and second oil supply passages 42 and 44. A space formed within the oil reservoir 46, which is constituted by the bottom portion of the casing 14, is divided by a first partition wall 50 into a rear portion as seen in a longitudinal direction of the hybrid vehicle 10, and the other portion. This rear portion of the space serves as a first oil reservoir portion 52 located below the differential gear device 32. The above-indicated other portion of the space is divided by a second partition wall 53 into two parts located adjacent to each other in the longitudinal direction of the hybrid vehicle 10, namely, a second oil reservoir portion 54 located adjacent to the first oil reservoir portion 52, and a third oil reservoir portion 56 located adjacent to the second oil reservoir portion 54. A suction port 58 of the first oil pump P1 is disposed within the second oil reservoir portion 54, while a suction port 60 of the second oil pump P2 is disposed within the third oil reservoir portion 56. These two suction ports 58 and 60 are connected to the respective first and second oil pumps P1 and P2 through respective suction passages.

The first and second partition walls 50 and 53 function as an oil-flow restricting portion which allows but restricts flows of the oil 48 between the first and second oil reservoir portions 52 and 54, and between the second and third oil reservoir portions 54 and 56, such that baths of the oil 48 in the first, second and third oil reservoir portions 52, 54 and 56 have different levels, when the first and second oil pumps P1 and P2 are operated. Namely, when the first and second oil pumps P1 and P2 are both held at rest while the hybrid vehicle 10 is stationary, the baths of the oil 48 in all of the three oil reservoir portions 52, 54 and 56 have the same level, that is, a static level Lst indicated by a one-dot chain line in FIG. 2, which level Lst is higher than upper ends of the first and second partition walls 50 and 53, since the oil 48 delivered to the various lubricated portions of the transaxle 12 drops down into the oil reservoir 46 while the oil pumps P1 and P2 are held at rest. When the oil pumps P1 and P2 are operated during running of the hybrid vehicle 10, however, the oil 48 is delivered from the oil pumps P1 and P2 to the various lubricated portions of the transaxle 12, so that a volume of the oil 48 staying in the oil reservoir 46 is reduced, whereby the levels of the baths of the oil 48 in the oil reservoir portions 52, 54 and 56 are lowered below the upper ends of the partition walls 50 and 53, and to respective different heights indicated by solid lines in FIG. 2, due to the flow restricting function of the partition walls 50 and 53.

The upper ends of the first and second partition walls 50 and 53 are higher than the lower end of the differential gear device 32, so that a lower portion of the differential gear device 32 is immersed in the bath of the oil 48 in the first oil reservoir portion 52 while the level of the oil 48 in the oil reservoir 46 is higher than the upper ends of the partition walls 50 and 53 in the stationary state of the hybrid vehicle 10. When the hybrid vehicle 10 is started in this stationary state in which the differential gear device 32 is partially immersed in the bath of the oil 48 in the first oil reservoir portion 52, the oil 48 is splashed up by the differential ring gear Gd, and is scattered over the lubricated portions of the transaxle 12, so that these lubricated portions can be sufficiently lubricated during starting of the hybrid vehicle 10 wherein the first oil pump P1 has difficulty to deliver a sufficient amount of the oil 48.

While the oil pumps P1 and P2 are operated during running of the hybrid vehicle 10, on the other hand, the level of the oil 48 is lowered below the upper ends of the partition walls 50 and 53 as a result of splashing of the oil 48 by the differential ring gear Gd rotated according to the running speed V of the hybrid vehicle 10, and suction of the oil 48 by the oil pumps P1 and P2. The level of the bath of the oil 48 in the first oil reservoir portion 52 is determined by a difference between the amount of the oil 48 splashed up by the differential ring gear Gd and the amount of the oil 48 returned back into the first oil reservoir portion 52, and the level of the bath of the oil 48 in the second oil reservoir portion 54 is determined by a difference between the amount of the oil 48 sucked by the first oil pump P1 and the amount of the oil 48 returned back into the second oil reservoir portion 54, while the level of the bath of the oil 48 in the third oil reservoir portion 56 is determined by a difference between the amount of the oil 48 sucked by the second oil pump P2 and the amount of the oil 48 returned back into the third oil reservoir portion 56. In the present embodiment, the volume of the first oil reservoir portion 52 is determined, namely, the position and shape of the first partition wall 50 are determined such that the level of the bath of the oil 48 in the first oil reservoir portion 52 can be lowered to a lowest position, so that agitation of the oil 48 by the rotary motion of the differential gear device 32 is restricted to reduce a power loss due to the agitation. Further, the levels of the baths of the oil 48 in the second and third oil reservoir portions 54 and 56 in which the suction ports 58 and 60 are disposed are made higher than the level in the first oil reservoir portion 52, so that it is possible to reduce a risk of air suction by the oil pumps P1 and P2 due to exposure of the suction ports 58 and 60 above the levels of the baths of the oil 48 in the second and third oil reservoir portions 54 and 56, whereby the oil 48 can be adequately sucked by the oil pumps P1 and P2, and stably delivered to the predetermined lubricated portions of the transaxle 12.

In addition, the second and third oil reservoir portions 54 and 56 which are separated from each other by the second partition wall 53 in the longitudinal direction of the hybrid vehicle 10 have comparatively small dimensions in the longitudinal direction, making it possible to reduce an amount of variation, in the longitudinal direction, of a distance from the bottoms of the oil reservoir portions 54 and 56 to the oil levels of the baths of the oil 48 therein, which variation takes place due to a change of attitude of the hybrid vehicle 10 according to a gradient of the roadway surface, or acceleration or deceleration of the hybrid vehicle 10, whereby it is possible to more effectively reduce the risk of air suction by the oil pumps P1 and P2 the suction ports 58 and 60 of which are disposed in the oil reservoir portions 54 and 56. In this respect, it is noted that the first and second partition walls 50 and 53 may have the same height dimension, and that the first and second partition walls 50 and 53 need not be provided.

The first oil pump P1 is operatively connected to and operated by the vehicle drive force output portion in the form of the differential gear device 32, and the first oil supply passage 42 connected to a delivery port of the first oil pump P1 is provided to deliver the oil 48 to the lubricated portions of the power transmitting mechanism 16. The lubricated portions include bearings 62 and gears 64 (Ge, Gr1, Gr2, Gd, Gm, Gp) incorporated in the power transmitting mechanism 16. The first oil pump P1 is operatively connected to and operated by the differential gear device 32, and is therefore operated even in the EV drive mode in which the engine 20 is held at rest, so that the first oil pump P1 is able to suck the oil 48 by an amount according to the vehicle running speed V, and to deliver the oil 48 to the lubricated portions. That is, the vehicle running speed V corresponds to an operating speed of the first oil pump P1, and to a volume of the oil 48 delivered from the first oil pump P1. Although the differential gear device 32 is lubricated with the oil 48 splashed up by the differential ring gear Gd, the differential gear device 32 may be lubricated with the oil 48 delivered through the first oil supply passage 42. Further, an oil storage may be provided as needed to ensure a stable supply of the oil 48 to the first oil pump P1, for preventing a risk of air suction by the first oil pump P1.

The second oil supply passage 44 is connected to a delivery port of the second oil pump P2, to deliver the oil 48 to the predetermined lubricated portions located upwardly of the second and third oil reservoir portions 54 and 56. These lubricated portions include: the input shaft 22; the planetary gear set 24; and the first motor/generator MG1. The second oil supply passage 42 is provided with a heat exchanger 66 to cool the oil 48, so that the cooled oil 48 is delivered to the first motor/generator MG1 and the second motor/generator MG2, for cooling and preventing overheating of the motor/generator MG1 and the motor/generator MG2. For example, the heat exchanger 66 is an oil cooler of an air cooling or water cooling type for cooling the oil 48. Since the engine 20 used to operate the second oil pump P2 can be operated even while the hybrid vehicle 10 is stationary, an adequate amount of the oil 48 can be sucked by and delivered to the lubricated portions from the second oil pump P2, irrespective of a variation of the vehicle running speed V, even while the hybrid vehicle 10 is stationary. It is noted that the second oil pump P2 may be dispensed with, provided the first oil pump P1 is adapted to deliver the oil 48 also to the motor/generator MG1 and motor/generator MG2, and the planetary gear set 24.

Figure 3:
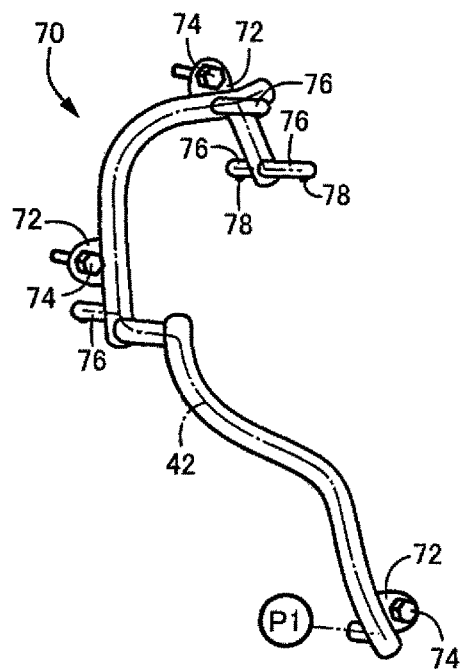
FIG. 3 is a schematic perspective view showing an oil piping assembly which provides a first oil supply passage of the lubricating device shown in FIG. 2.

FIG. 3 is the schematic perspective view showing an oil piping assembly 70 according to a first embodiment of this invention, which has the first oil supply passage 42. The oil piping assembly 70 is formed separately from the casing 14, and is provided with a plurality of fixing portions 72 which are to be fixed to an inner wall surface of the casing 14 or to an outer surface of a housing of the first oil pump P1 with fastening bolts 74, such that the oil piping assembly 70 is located at a predetermined position within the casing 14. The oil piping assembly 70 has a plurality of hollow nozzle portions 76 from which the oil 48 is ejected to the bearings 62 and the gears 64. The oil piping assembly 70 has a three-dimensionally bent generally hollow structure. The oil piping assembly 70 is a resin piping assembly formed of a synthetic resin material so as to define an oil passage in the form of the first oil supply passage 42 through which the oil 48 flows. The oil 48 is a lubricant oil for lubricating the lubricated portions in the form of the bearings 62 and gears 64.

Figure 4:
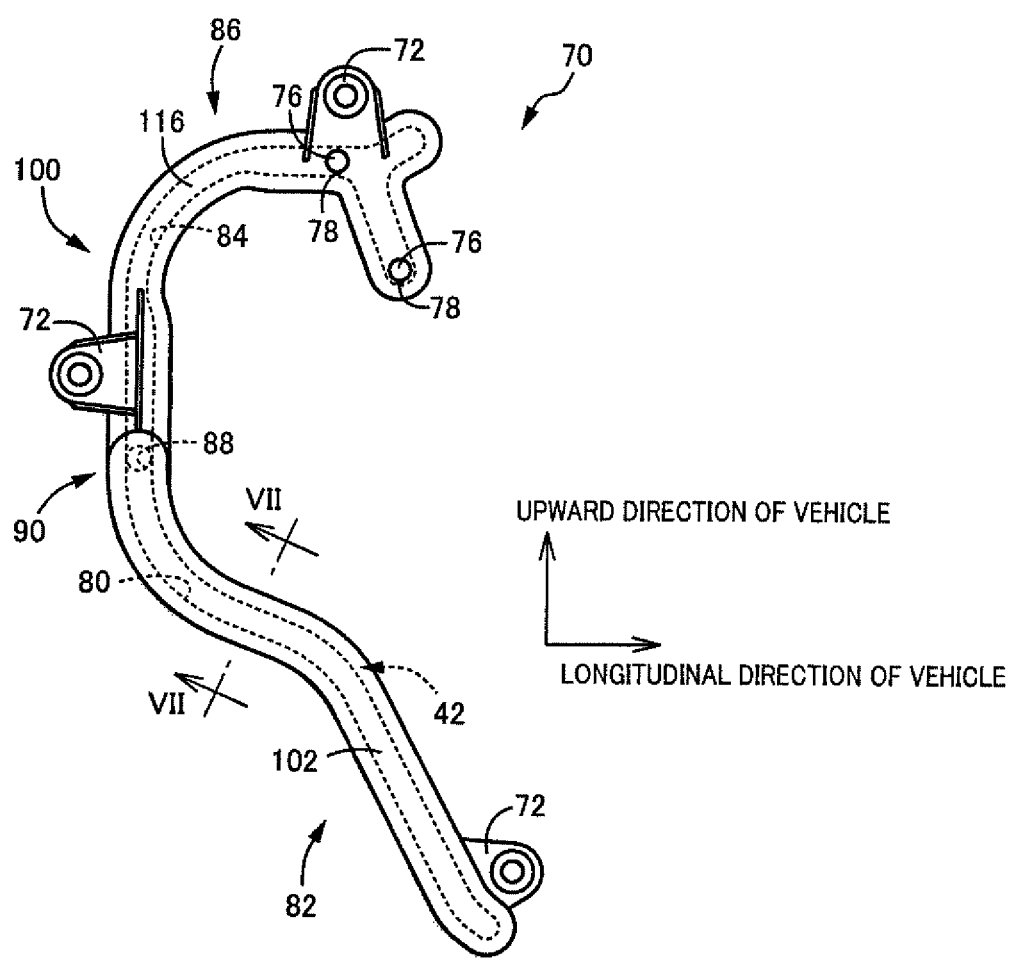
FIG. 4 is a front elevational view of the oil piping assembly of FIG. 3 as seen in a width or transverse direction of the hybrid vehicle.
Figure 5:
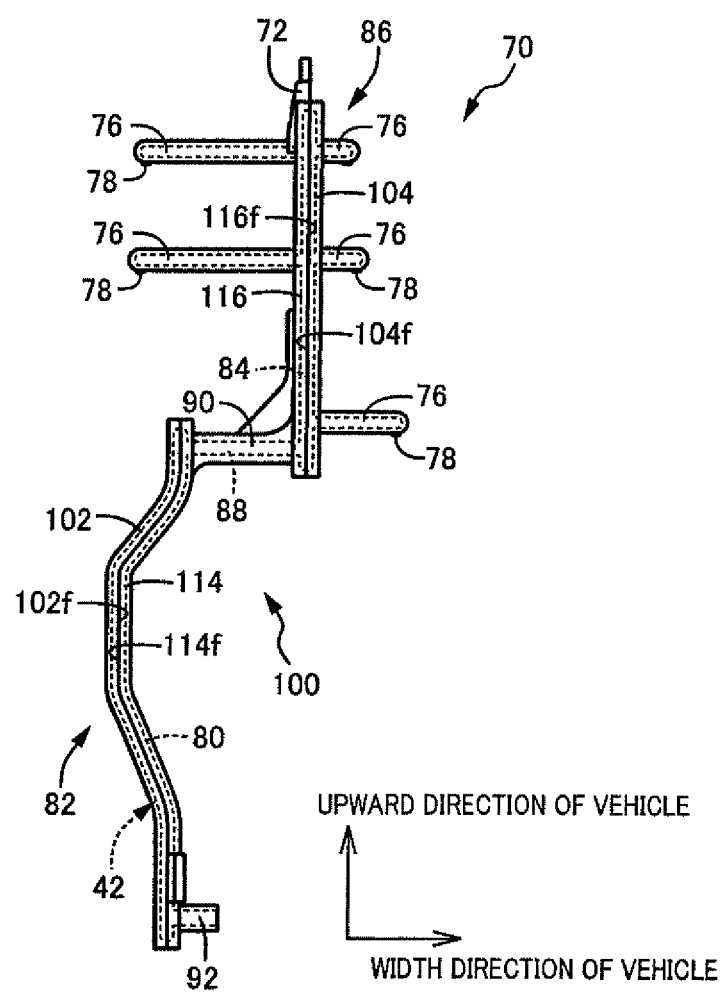
FIG. 5 is a side elevational view of the oil piping assembly as seen in the leftward direction of FIG. 4.

FIG. 4 is the front elevational view of the oil piping assembly 70 as seen in the width or transverse direction of the hybrid vehicle 10, and FIG. 5 is the side elevational view of the oil piping assembly 70 as seen in the leftward direction of FIG. 4. The oil piping assembly 70 is a three-dimensional structure, and the first oil supply passage 42 is accordingly a three-dimensional passage indicated by broken lines in FIG. 5. Described more specifically, the oil piping assembly 70 includes a first pipe portion 82 having a first passage portion 80, a second pipe portion 86 having a second passage portion 84, and a connecting pipe portion 90 having a connecting passage portion 88 for communication between the first and second passage portions 80 and 84. The first passage portion 80 has a limited three-dimensional configuration more or less similar to a two-dimensional configuration, and the second passage portion 84 has a two-dimensional configuration. The second pipe portion 86 having the second passage portion 84 has a two-dimensional structure lying in a substantially vertical two-dimensional plane defined by a vertical direction and the longitudinal direction of the hybrid vehicle 10. The first pipe portion 82 having the first passage portion 80 has a limited three-dimensional structure including a curved intermediate part which protrudes from a two-dimensional plane parallel to the two-dimensional plane of the second pipe portion 86, in the width or transverse direction of the hybrid vehicle 10. The curved intermediate part includes inclined sections having inclination angles not larger than 45°. The connecting pipe portion 90 having the connecting passage portion 88 extends substantially linearly in the width direction of the hybrid vehicle 10 and in a substantially horizontal direction, and is connected to the first and second pipe portions 82 and 86, so as to intersect at right angles these pipe portions 82 and 86 respectively. As shown in FIG. 4, the first and second pipe portions 82 and 86 extend from the connecting pipe portion 90 in the respective opposite vertical directions (downward and upward directions). The plurality of hollow nozzle portions 76 of the second pipe portion 86 extend linearly in the horizontal direction (width direction of the hybrid vehicle 10) parallel with the connecting pipe portion 90, and have respective delivery nozzles 78 formed at their end parts such that the delivery nozzles 78 are open externally of the nozzle portions 76, more specifically, open downwards in the present embodiment. The first pipe portion 82 has a cylindrical connector port 92 formed at an end part of the first pipe portion 82 remote from the connecting pipe portion 90 such that the connector port 92 extends linearly in the horizontal direction (width direction of the hybrid vehicle 10) parallel with the connecting pipe portion 90.

Figure 6:
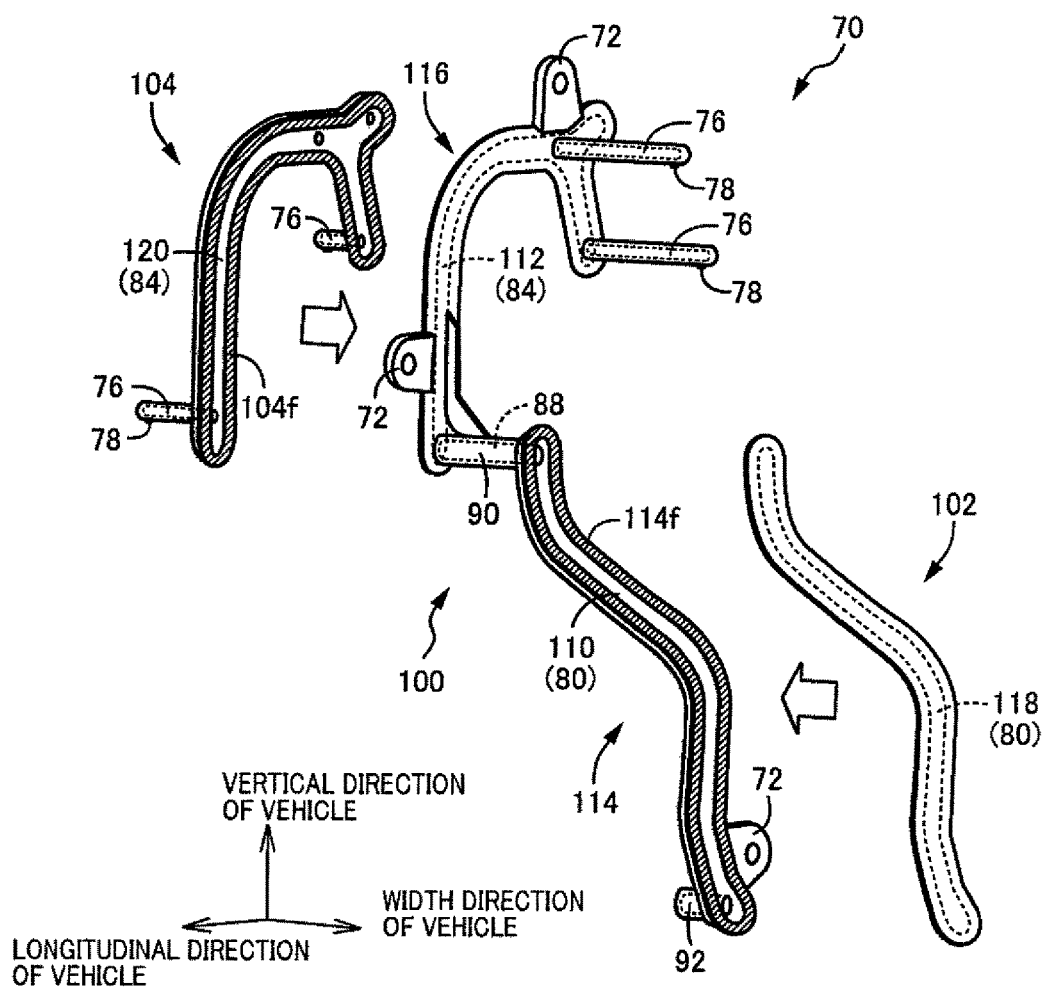
FIG. 6 is a perspective view of three divisional components of the oil piping assembly before the divisional components are bonded together to form the oil piping assembly.

The above-described oil piping assembly 70 includes a plurality of divisional components corresponding two of which cooperate to define a circumference of the first oil supply passage 42 along a length of the first oil supply passage 42. Each divisional component is made of resin material. As shown in FIG. 6, the oil piping assembly 70 according to the present embodiment consists of three divisional components, that is, a base divisional component 100, a first divisional component 102 and a second divisional component 104. The base divisional component 100 consists of a pair of half components, that is, a first half component 114 and a second half component 116 which have respective first and second A-grooves 110 and 112 which are open in respective opposite directions. The first and second half components 114 and 116 also have respective interfacial surfaces 114f and 116f. The first A-groove 110 is open in the direction of the interfacial surface 114f, i.e., the normal direction of the interfacial surface 114f or a direction perpendicular to the interfacial surface 114f, namely, open in the leftward direction as seen in FIG. 5, and the second A-groove 112 is open in the direction perpendicular to the interfacial surface 116f, namely, open in the rightward direction as seen in FIG. 5. That is, the first and second A-grooves 110 and 112 are open in the respective opposite directions parallel to the width direction of the hybrid vehicle 10, and the first and second half components 114 and 116 are offset or spaced apart from each other in the width direction of the hybrid vehicle 10. Described more specifically, the first half component 114 is offset or spaced apart from the second half component 116 in the rightward direction parallel to the width direction of the hybrid vehicle 10, as seen in FIG. 6, while the second A-groove 112 formed in the second half component 116 is open in the leftward direction. The first and second half components 114 and 116 are connected to each other at their respective upper and lower end portions, by the connecting pipe portion 90 extending in the width direction of the hybrid vehicle 10, such that the first and second half components 114 and 116 extend from the connecting pipe portion 90 in the respective vertically opposite directions, that is, in the downward and upward directions. The connecting passage portion 88 formed through the connecting pipe portion 90 is open in bottom walls of the first and second A-grooves 110 and 112. Further, the connector port 92 extends integrally from the lower end portion of the first half component 114, linearly parallel with the connecting pipe portion 90, in the direction opposite to the direction in which the first A-groove 110 is open, while the nozzle portions 76 extend integrally from the second half component 116, linearly parallel with the connecting pipe portion 90, in the direction opposite to the direction in which the second A-groove 112 is open. Hatching lines in FIG. 6 around the first A-groove 110 represent the interfacial surface 114f, for easier recognition of the interfacial surface 114f.

Figure 8:
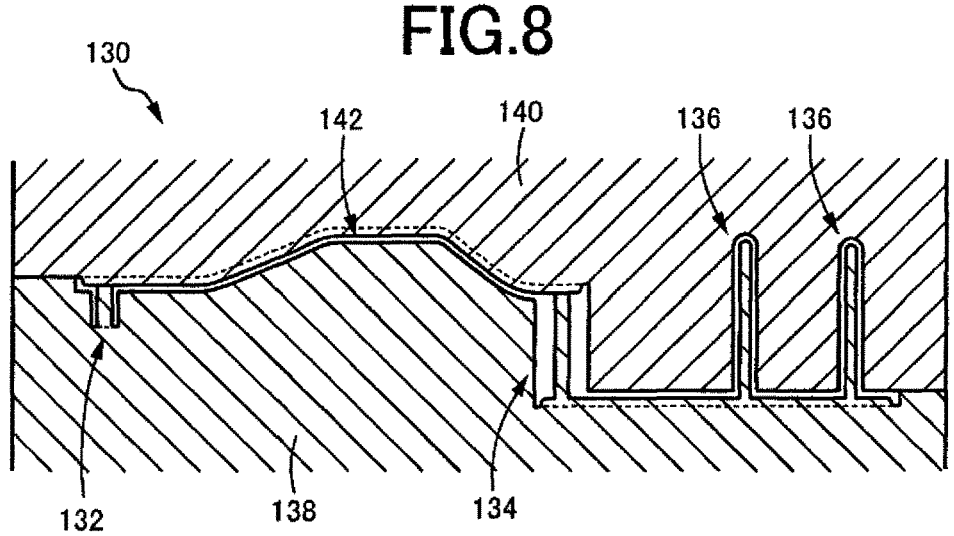
FIG. 8 is a cross sectional view of a molding device for forming the base divisional component shown in FIG. 6.

FIG. 8 is the cross sectional view of a molding device 130 for integrally forming the base divisional component 100 by an injection molding process. The molding device 130 has a molding portion 132 for forming the connector port 92, a molding portion 134 for forming the connecting pipe portion 90, and molding portions 136 for forming the plurality of nozzle portions 76. These molding portions 132, 134 and 136, which are parallel to each other, lie in one plane. The molding device 130 principally consists of a lower stationary mold 138 and an upper movable mold 140. The movable mold 140 is movable upwards and downwards away from and toward the stationary mold 138. That is, the direction in which the movable mold 140 is vertically movable (as seen in FIG. 8) is parallel to a direction of extension of the mutually parallel connecting pipe portion 90, nozzle portions 76 and connector port 92, and is parallel to the direction in which the first and second A-grooves 110 and 112 are open, which direction is perpendicular to the interfacial surfaces 114f and 116f. When the molding device 130 is placed in a closed state with the movable mold 140 being moved downwards as seen in FIG. 8, a mold cavity 142 having the molding portions 132, 134 and 136 is formed within the thus closed molding device 130. A molten resin material is injected into the mold cavity 142, and is then cooled and cured. As a result, the base divisional component 100 having the first and second A-grooves 110 and 112 is formed within the mold cavity 142, integrally with the connecting pipe portion 90 having the connecting passage portion 88, the hollow nozzle portions 76, the cylindrical connector port 92. The base divisional component 100 may be subjected to a machining operation for its intricate shaping adjustment, as needed. For instance, the connecting pipe portion 90 may be subjected to a machining operation on an outer circumferential surface, to remove unnecessary stock or burrs. For instance, each of the delivery nozzles 78 of the nozzle portions 76 may be formed by the injection molding process to form the base divisional component 100, with a movement of a slidable mold (not shown in FIG. 8) which is incorporated within the movable mold 140 and which is movable by a cam, in the leftward and rightward directions as seen in FIG. 8, in synchronization of the movement of the movable mold 140. However, the delivery nozzles 78 may be formed by a machining operation, for example, after the injection molding process. While the fixing portions 72 are formed integrally with the base divisional component 100 by the injection molding process, reinforcing metallic plates are embedded in the fixing portions 72 as needed, by an insert-forming process.

Referring back to FIG. 6, the first divisional component 102 has a first B-groove 118 and cooperates with the first half component 114 of the base divisional component 100, to define therebetween the first passage portion 80. The first divisional component 102 has an interfacial surface 102f around an opening of the first B-groove 118. The first divisional component 102 is bonded to the first half component 114 such that the interfacial surface 102f is held in abutting contact with the interfacial surface 114f around an opening of the first A-groove 110. Thus, the first passage portion 80 is defined by the first A-groove 110 and the first B-groove 118. The first B-groove 118 is open in the direction perpendicular to the interfacial surface 102f of the first divisional component 102, namely, open in the rightward direction as seen in FIG. 5, so that the interfacial surface 114f of the first half component 114 and the interfacial surface 102f of the first divisional component 102 are fluid-tightly abuttable with each other. It is noted that the interfacial surface 102f is a third interfacial surface, while the interfacial surface 114f is a first interfacial surface which has recesses and protrusions for fluid-tight contact with respective protrusions and recesses of the third interfacial surface.

Figure 9:
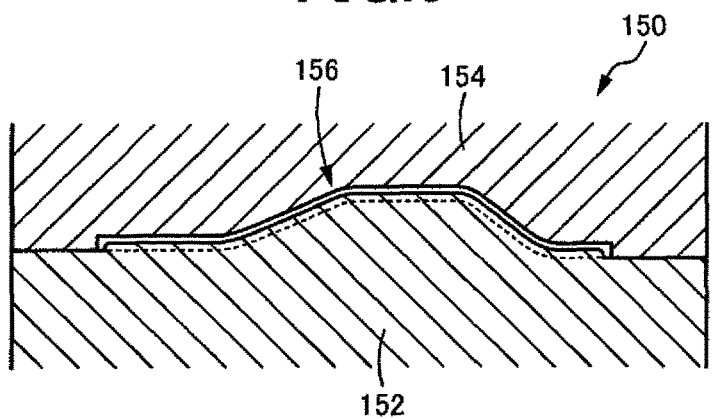
FIG. 9 is a cross sectional view of a molding device for forming the first divisional component shown in FIG. 6.

FIG. 9 is the cross sectional view of a molding device 150 for integrally forming the first divisional component 102 by an injection molding process. The molding device 150 principally consists of a lower stationary mold 152 and an upper movable mold 154. The movable mold 154 is movable upwards and downwards away from and toward the stationary mold 152. That is, the direction in which the movable mold 154 is vertically movable (as seen in FIG. 9) is parallel to the direction in which the first B-groove 118 is open, which direction is perpendicular to the interfacial surface 102f. When the molding device 150 is placed in a closed state with the movable mold 154 being moved downwards as seen in FIG. 9, a mold cavity 156 corresponding to the first divisional component 102 is formed within the thus closed molding device 150. A molten resin material is injected into the mold cavity 156, and is then cooled and cured. As a result, the first divisional component 102 having the first B-groove 118 is integrally formed within the mold cavity 156. The first divisional component 102 may be subjected to a machining operation for its intricate shaping adjustment, as needed.

The second divisional component 104 has a second B-groove 120 and cooperates with the second half component 116 of the base divisional component 100, to define therebetween the second passage portion 84. The second divisional component 104 has an interfacial surface 104f around an opening of the second B-groove 120. The second divisional component 104 is bonded to the second half component 116 such that the interfacial surface 104f is held in abutting contact with the interfacial surface 116f around an opening of the second A-groove 112. Thus, the second passage portion 84 is defined by the second A-groove 112 and the second B-groove 120. The second B-groove 120 is open in the direction perpendicular to the interfacial surface 104f of the second divisional component 104, namely, open in the leftward direction as seen in FIG. 5, so that the interfacial surface 116f of the second half component 116 and the interfacial surface 104f of the second divisional component 104 are fluid-tightly abuttable with each other. It is noted that the interfacial surface 104f is a fourth interfacial surface, while the interfacial surface 116f is a second interfacial surface which has recesses and protrusions for fluid-tight contact with respective protrusions and recesses of the fourth interfacial surface. As shown in FIG. 5, the second divisional component 104 has the plurality of integrally formed hollow nozzle portions 76 linearly extending in the width direction of the hybrid vehicle 10, more specifically, in the direction opposite to the direction in which the second B-groove 120 is open. Hatching lines in FIG. 6 around the second B-groove 120 represent the interfacial surface 104f, for easier recognition of the interfacial surface 104f.

Figure 10:
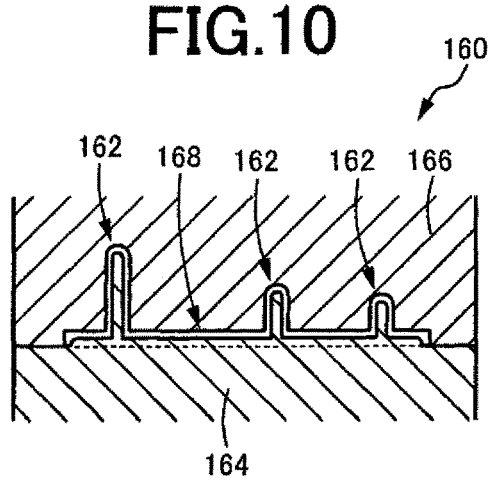
FIG. 10 is a cross sectional view of a molding device for forming the second divisional component shown in FIG. 6.

FIG. 10 is the cross sectional view of a molding device 160 for integrally forming the second divisional component 104 by an injection molding process. The molding device 160 has a molding portion 162 for forming the plurality of mutually parallel nozzle portions 76. The molding device 160 principally consists of a lower stationary mold 164 and an upper movable mold 166. The movable mold 166 is movable upwards and downwards away from and toward the stationary mold 164. That is, the direction in which the movable mold 166 is vertically movable (as seen in FIG. 10) is parallel to the direction of extension of the nozzle portions 76 and to the direction in which the second B-groove 120 is open, which direction is perpendicular to the interfacial surface 104f. When the molding device 160 is placed in a closed state with the movable mold 166 being moved downwards as seen in FIG. 10, a mold cavity 168 having the molding portion 162 is formed within the thus closed molding device 160. A molten resin material is injected into the mold cavity 168, and is then cooled and cured. As a result, the second divisional component 104 having the nozzle portions 76 and the second B-groove 120 is integrally formed within the mold cavity 168. The second divisional component 104 may be subjected to a machining operation for its intricate shaping adjustment, as needed. For instance, each of the delivery nozzles 78 of the nozzle portions 76 may be formed by the injection molding process to form the second divisional component 104, with a movement of a slidable mold (not shown in FIG. 10) which is incorporated within the movable mold 166 and which is movable by a cam, in the leftward and rightward directions as seen in FIG. 10, in synchronization of the movement of the movable mold 166. However, the delivery nozzles 78 may be formed by a machining operation, for example, after the injection molding process.

Figure 7:
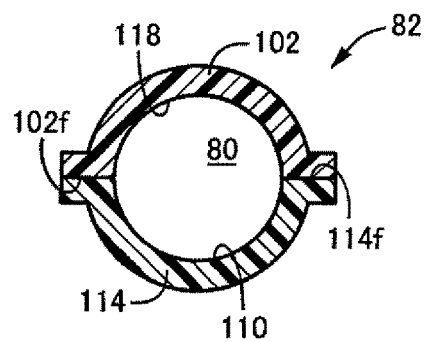
FIG. 7 is a cross sectional view of the oil piping assembly taken in a direction indicated by lines VII-VII in FIG. 4.

Then, the first and second divisional components 102 and 104 are integrally bonded to the respective first and second half components 114 and 116 of the base divisional component 100, by a vibration welding process. Namely, the first divisional component 102 and the first half component 114 are pressed in the respective leftward and rightward directions as seen in FIG. 5, for pressing fluid-tight contact of the interfacial surfaces 102f and 114f with each other in the direction substantially perpendicular to these surfaces 102f and 114f, while the components 102 and 114 are vibrated in the directions perpendicular to the plane of the view of FIG. 5 such that the interfacial surfaces 102f and 114f are kept in pressing sliding contact with each other, whereby these surfaces 102f and 114f are welded together due to friction heat. As a result, the first pipe portion 82 having the first passage portion 80 is obtained. FIG. 7 is the schematic cross sectional view of the first pipe portion 82 taken in a direction indicated by lines VII-VII in FIG. 4. The first divisional component 102 and the first half component 114 are bonded together with their interfacial surfaces 102f and 114f being held in contact with each other. Further, the thus bonded components 102 and 114 have two flanges, as needed, which flanges extend radially outwardly from their respective two circumferential positions at which the interfacial surfaces 1021 and 114f are held in contact with each other.

Similarly, the second divisional component 104 and the second half component 116 are pressed in the respective leftward and rightward directions as seen in FIG. 5, for pressing fluid-tight contact of the interfacial surfaces 1041 and 116f with each other in the direction substantially perpendicular to these surfaces 104f and 1161, while the components 104 and 116 are vibrated in the directions perpendicular to the plane of the view of FIG. 5, or in the upward and downward directions, such that the interfacial surfaces 1041 and 116f are kept in pressing sliding contact with each other, whereby these surfaces 104f and 116f are welded together due to friction heat. As a result, the second pipe portion 86 having the second passage portion 84 is obtained. The thus obtained second pipe portion 86 is connected to the first pipe portion 82, whereby the desired oil piping assembly 70 is manufactured. The thus bonded components 104 and 116 also have two flanges (not shown), as needed, which flanges extend radially outwardly from their respective two circumferential positions at which the interfacial surfaces 1041 and 116f are held in contact with each other. In the vibration welding process to weld the first and second divisional components 102 and 104 to the respective first and second half components 114 and 116 of the base divisional component 100, the interfacial surfaces 102f, 104f, 114f and 116f may be heated by exposure to infrared rays, as needed, before the vibration welding operation is performed together with the pressing operation.

It is noted that the injection molding process to integrally form each of the base divisional component 100, the first divisional component 102 and the second divisional component 104 by using the respective molding devices 130, 150 and 160 shown in FIGS. 8 to 10 respectively is a forming step of the process of forming the oil piping assembly 70 according to the present embodiment of this invention. It is further noted that the vibration welding process to bond the first divisional component 102 to the first half component 114 of the base divisional component 100 is a first bonding step of the above-indicated process of forming the oil piping assembly 70, while the vibration welding process to bond the second divisional component 104 to the second half component 116 of the base divisional component 100 is a second bonding step of the above-indicated process of forming the oil piping assembly 70. The first and second bonding steps may be implemented in this order of description, or vice versa.

As described above, the resin piping assembly 70 according to the present embodiment of the invention comprises the base divisional component 100 including the first and second half components 114 and 116 connected to each other through the connecting pipe portion 90, and the first and second divisional components 102 and 104 cooperating with the respective first and second half components 114 and 116 to form the respective first and second passage portions 80 and 84 of the oil passage 42. For bonding the first and second divisional components 102 and 104 to the respective first and second half components 114 and 116 in the vibration welding process by pressing contact of the first and third interfacial surfaces 114f and 102f with each other, and by pressing contact of the second and fourth interfacial surfaces 116f and 104f with each other, each of those first through fourth interfacial surfaces 114f, 116f, 102f and 104f is required to have a two-dimensional configuration or a limited three-dimensional configuration, so that a desired pressing force can be applied to an entire area of each of the interfacial surfaces 114f, 116f, 102f and 104f. Accordingly, each of the first and second passage portions 80 and 84 is also required to have a two-dimensional configuration or a limited three-dimensional configuration. In the oil piping assembly 70 according to the present embodiment, however, the configurations of the first and second passage portions 80 and 84 can be designed independently of each other, so as to permit application of the desired pressing force to the entire area of each interfacial surface 114f, 116f, 102f, 104f. Further, the first and second passage portions 80 and 84 are spaced apart from each other and are held in communication with each other through the connecting pipe portion 90, so that the oil piping assembly 70 has a high degree of freedom of design of configuration of the oil passage 42 including the connecting passage portion 88 of the connecting pipe portion 90. Accordingly, the present oil piping assembly 70 can be formed to have a comparatively complicated three-dimensional configuration while ensuring a high degree of bonding of the first and second divisional components 102 and 104 to the first and second half components 114 and 116 of the base divisional component 100.

The present embodiment is further configured such that the connecting pipe portion 90 having the connecting passage portion 88 for communication between the first and second passage portions 84 and 88 is a completely cylindrical body a diameter, a wall thickness and other specifications of which can be suitably and easily determined so as to have a required strength. This cylindrical connecting pipe portion 90 having the required strength cooperates with the first and second divisional components 102 and 104 having a sufficient strength of their mutual bonding, to permit the resin piping assembly 70 to have a high degree of freedom of design of configuration of the first oil supply passage 42 as well as a high degree of strength.

The present embodiment is also configured such that the connecting pipe portion 90 linearly extends along a straight line (in the width direction of the hybrid vehicle 10), and the first and second A-grooves 110 and 112 of the first and second interfacial surfaces 114f and 116f of the first and second half components 114 and 116 of the base divisional component 100 are open in respective opposite directions parallel to the straight line. Further, the first and second half components 114 and 116 are spaced apart from (offset with respect to) each other in the direction parallel to the straight line, and are connected at their ends to each other through the connecting pipe portion 90, such that the first and second half components 114 and 116 extend from the connecting pipe portion 90 in respective opposite directions perpendicular to the straight line. Accordingly, the base divisional component 100 including the first and second half components 114 and 116 and the connecting pipe portion 90 can be formed as a one-piece body with the first and second interfacial surfaces 114f and 116f having the respective A-grooves 110 and 112, by an injection molding process by using the molding device 130 provided with the stationary mold 138 and the movable mold 140 which are movable relative to each other in the direction parallel to the above-indicated straight line. Thus, the base divisional component 100 can be easily and economically formed. The molding device 130 need not be provided with a sliding mold movable in a direction perpendicular to the straight line, and may principally consist of the stationary and movable molds 138 and 140, so that the molding device 130 has a comparatively simple structure, which can be manufactured at a low cost.

The present embodiment is further configured such that the second half component 116 of the base divisional component 100 and the second divisional component 104 are provided with the integrally formed hollow nozzle portions 76 extending in the direction opposite to the directions in which the grooves 112 and 120 of the second and fourth interfacial surfaces 116*f* and 104*f* are open. The hollow nozzle portions 76 permit extension of the first oil supply passage 42, without reducing the strength of bonding of the second divisional component 104 to the second half component 116 of the base divisional component 100. Further, the hollow nozzle portions 76 formed integrally with the base divisional component 100 and the second divisional component 104 permit economical manufacture of the oil piping assembly 70 with a reduced number of parts, than where separately formed nozzles are fixed to a resin piping assembly with screws or any other fastening members.

The present embodiment is also configured such that the cylindrical connecting pipe portion 90 linearly extends along a straight line, and the second half component 116 of the base divisional component 100 is provided with the hollow nozzle portions 76 such that the hollow nozzle portions 76 linearly extend along a straight line parallel to the direction of extension of the cylindrical connecting pipe portion 90. Accordingly, the base divisional component 100 including the connecting pipe portion 90 and the hollow nozzle portions 76 can be formed as a one-piece body, by an injection molding process or a press-forming process, for example, by using the molding device 130 provided with the stationary and movable molds 138 and 140 which are movable toward and away from each other in the direction parallel to the above-indicated straight line. Thus, the base divisional component 100 including the cylindrical connecting pipe portion 90 and the hollow nozzle portions 76 can be easily and economically formed.

The present embodiment is further configured such that the first half component 114 of the base divisional component 100 is provided, at its end remote from the second half component 116, with the integrally formed cylindrical connector port 92 such that the cylindrical connector port 92 linearly extend along the straight line parallel to the direction of extension of the cylindrical connecting pipe portion 90, in the direction opposite to the direction in which the first A-groove 110 formed in the first interfacial surface 114*l* is open. Accordingly, the cylindrical connector port 92 can be formed, without reducing the strength of bonding of the first divisional component 102 to the first half component 114. Further, the cylindrical connector port 92 formed integrally with the base divisional component 100 permits economical manufacture of the resin piping assembly 70 with a reduced number of parts, than where a separately formed connector port is fixed to a resin piping assembly with screws or any other fastening members. In addition, since the connector port 92 is formed so as to extend along the straight line parallel to the direction of extension of the connecting pipe portion 90, the base divisional component 100 including the connector port 92 as well as the connecting pipe portion 90 and the hollow nozzle portions 76 can be formed as a one-piece body, by an injection molding process or a press-forming process, for example, by using the molding device 130 provided with the stationary and movable molds 138 and 140 which are movable relative to each other in the direction parallel to the above-indicated straight line. Thus, the base divisional component 100 including the connecting pipe portion 90, the hollow nozzle portions 76 and the connector port 92 can be easily and economically formed.

The oil piping assembly 70 is used to deliver the lubricant oil 48 to the bearings 62 and the gears 64 of the vehicular power transmitting system in the form of the transaxle 12. Since the first oil supply passage 42 has a high degree of freedom of design of its configuration, the oil piping assembly 70 can be compactly disposed in a complicated narrow space within the casing 14 of the transaxle 12, and can deliver the lubricant oil 48 exactly to the bearings 62 and the gears 64 in a pin-pointing manner, so that a required volume of the lubricant oil 48 can be reduced.

According to the present embodiment, after the base divisional component 100, and the first and second divisional components 102 and 104 are formed by the injection molding process, the first half component 114 of the base divisional component 100 and the first divisional component 102 are bonded together with their limited three-dimensional first and third interfacial surfaces 114*f* and 102*f* being held in pressing contact with each other, while the second half component 116 of the base divisional component 100 and the second divisional component 104 are bonded together with their two-dimensional second and fourth interfacial surfaces 116*f* and 104*f* being held in pressing contact with each other. Accordingly, the resin piping assembly 70 having a high degree of strength of bonding of the first and second divisional components 102 and 104 to the base divisional component 100 can be easily and economically manufactured, with a high degree of freedom of design of configuration of the first oil supply passage 42.

Further, the vibration welding process is implemented to bond the first and second divisional components 102 and 104 to the respective first and second half components 114 and 116 of the base divisional component 100. To ensure a desired strength of bonding of the divisional components 102 and 104 to the half components 114 and 116, the desired pressing force is required to be applied to the entire areas of the first and third interfacial surfaces 114*f* and 102*f*, and the entire areas of the second and fourth interfacial surfaces 116*f* and 104*f*. In this respect, it is noted that the first through fourth interfacial surfaces 114*f*, 116*f*, 102*f* and 104*f* have the limited three-dimensional or two-dimensional configurations, like the first and second passage portions 80 and 84, so that the first and second divisional components 102 and 104 can be adequately bonded to the respective first and second half components 114 and 116 in the vibration welding process, with the required pressing force being applied to the entire areas of the interfacial surfaces 114*f*, 116*f*, 102*f* and 104*f*.

Other embodiments of this invention will be described. It is noted that the same reference signs as used in the first embodiment will be used to identify the corresponding elements of the following embodiments, which will not be described redundantly.

Figure 11:
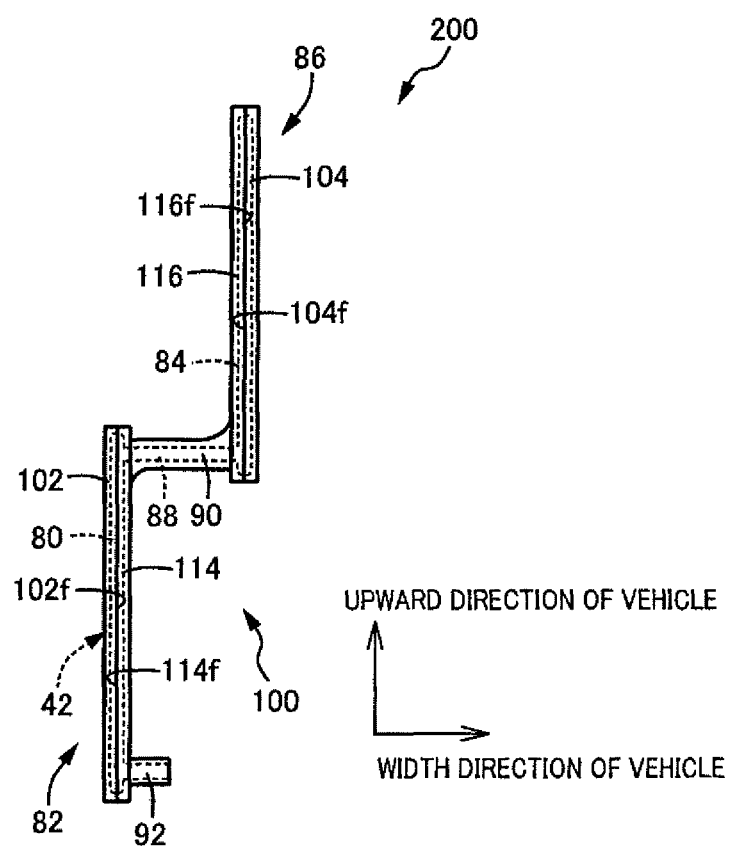
FIG. 11 is a side elevational view corresponding to that of FIG. 5, showing an oil piping assembly according to another embodiment of this invention.

Referring next to FIG. 11 which is the side elevational view corresponding to that of FIG. 5, showing an oil piping assembly 200 according to a second embodiment of this invention, which is formed of a resin material. A front elevational view of the oil piping assembly 200 is similar to that of FIG. 4. In this oil piping assembly 200, the first pipe portion 82, the second pipe portion 86, the first passage portion 80 formed through the first pipe portion 82, and the second passage portion 84 formed through the second pipe portion 86 have two-dimensional configurations as seen in two-dimensional planes which are perpendicular to a plane of the view of FIG. 11 and each of which is defined by the vertical and longitudinal directions of the hybrid vehicle 10. The oil piping assembly 200 includes the base divisional component 100 having the first and second interfacial surfaces 114f and 116f, the first divisional component 102 having the third interfacial surface 102f, and the second divisional component 104 having the fourth interfacial surface 1041. The first to fourth interfacial surfaces 114f, 102f, 116f, 104f are parallel to the two-dimensional planes. The oil piping assembly 200 is not provided with hollow nozzle portions. Instead, the second half component 116 or the second divisional component 104 has delivery nozzles or connector fittings held in communication with the second passage portion 84, so that the lubricant oil 48 is delivered from the delivery nozzles, or delivered through external oil passages connected to the connector fittings. It is noted that the connector port 92 shown in FIG. 11 may be dispensed with. In this case, the first half component 114 or the first divisional component 102 has a connector fitting which is held in communication with the first passage portion 80 and which is connected to the first oil pump P1.

In this oil piping assembly 200, too, the first pipe portion 82 and the second pipe portion 86 lie in respective two-dimensional planes which are spaced apart from each other in the width direction of the hybrid vehicle 10. Accordingly, the oil piping assembly 200 has substantially the same advantages as the oil piping assembly 70, in that the first and second divisional components 102 and 104 are bonded to the base divisional component 100 with a high degree of bonding strength, and in that the first oil supply passage 42 including the connecting passage portion 88 of the connecting pipe portion 90 has a high degree of freedom of design of its configuration.

Although the first and second half components 114 and 116 of the base divisional component 100, and the first and second divisional components 102 and 104 have the respective first, second, third and fourth interfacial surfaces 114f, 116f, 1021 and 104f parallel to the two-dimensional plane perpendicular to the plane of the view of FIG. 11 and parallel to the vertical direction of the hybrid vehicle 10, those interfacial surfaces 114f, 116f, 102f and 104f need not be parallel to each other. For instance, the second interfacial surface 116f of the second half component 116 of the base divisional component 100, and the fourth interfacial surface 104f of the second divisional component 104 may be parallel to the plane of the view of FIG. 11. Further, the second pipe portion 86 may be inclined in the width direction of the hybrid vehicle 10 as the second pipe portion 86 extends upwards from the connecting pipe portion 90. Namely, the second interfacial surface 116f of the second half component 116 bonded to the second divisional component 104 may be inclined as described above. This modification applies to the oil piping assembly 70 according to the first embodiment.

Figure 12:
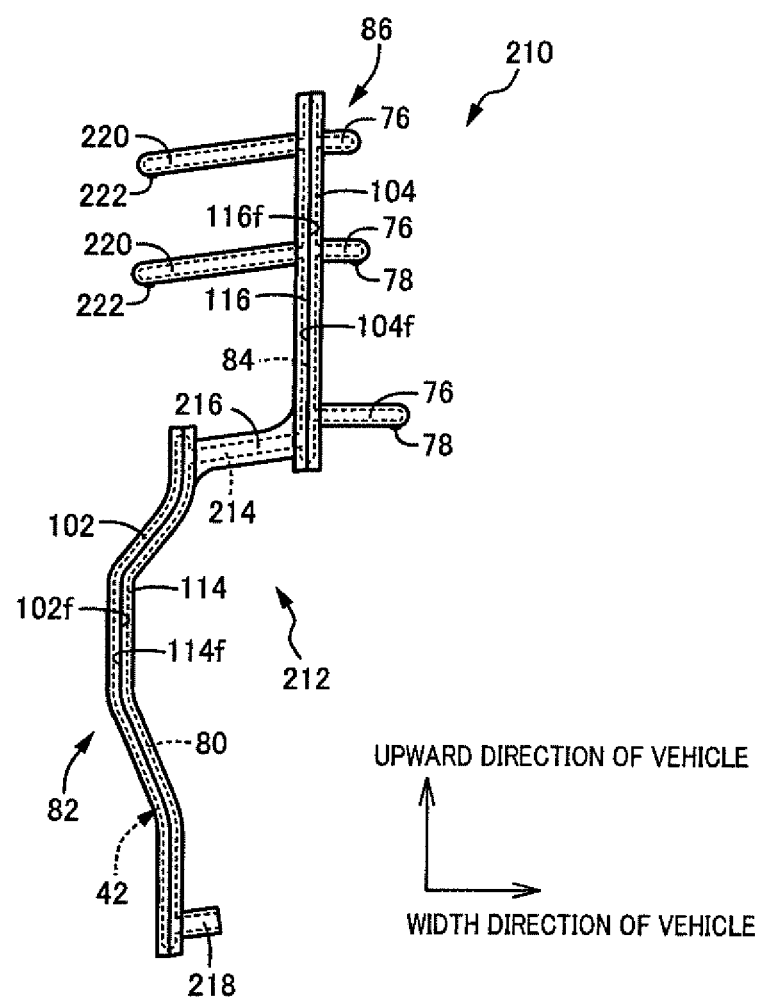
FIG. 12 is a side elevational view corresponding to that of FIG. 5, showing an oil piping assembly according to a further embodiment of the invention.

Reference is then made to FIG. 12 which is the side elevational view corresponding to that of FIG. 5, showing an oil piping assembly 210 according to a third embodiment of this invention, which is also formed of a resin material. A front elevational view of the oil piping assembly 210 is similar to that of FIG. 4. This oil piping assembly 210 is identical with the oil piping assembly 70, regarding the first and second divisional components 102 and 104, but is different from the oil piping assembly 70, regarding a base divisional component 212. Namely, the base divisional component 212 includes the first and second half components 114 and 116, like the base divisional component 100 in the first and second embodiments, and the first and second divisional components 102 and 104 are bonded to the base divisional component 212, by pressing the base divisional component 212 and the first and second divisional components 102 and 104 against each other in the leftward and rightward directions as seen in FIG. 12. However, the oil piping assembly 210 is different from the oil piping assembly 70, regarding a cylindrical connecting pipe portion 216 having a connecting passage portion 214 for communication between the first and second passage portions 80 and 84, a cylindrical connector port 218 provided on the first half component 114, and a plurality of hollow nozzle portions 220 provided on the second half component 116. The connecting pipe portion 216 connecting the first and second half components 114 and 116 linearly extends along a straight line inclined vertically with respect to the horizontal direction, in the vertical plane parallel to the width direction of the hybrid vehicle 10, as shown in FIG. 12, while horizontal direction crosses the first and second half components 114 and 116 at a right angle respectively. The connector port 218 and the hollow nozzle portions 220 linearly extend along a straight line parallel to the direction of extension of the connecting pipe portion 216. The hollow nozzle portions 220 have delivery nozzles 222 at their distal end portions such that the delivery nozzles 222 are open downwards.

Figure 13:
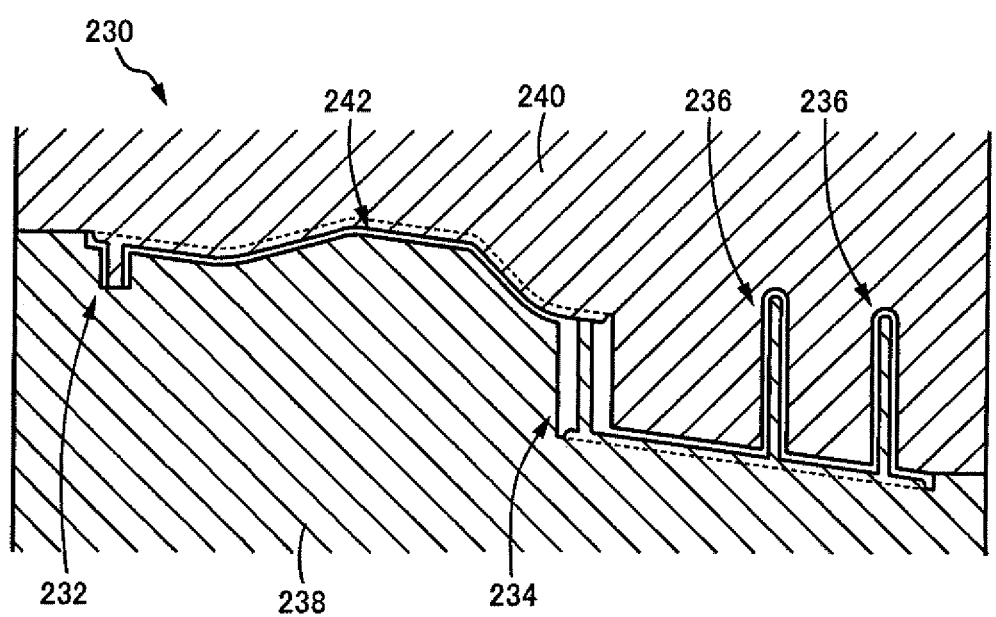
FIG. 13 is a cross sectional view of a molding device for forming a base divisional component shown in FIG. 12.

Like the base divisional component 100, the base divisional component 212 can also be formed as a one-piece unit by an injection molding process. FIG. 13 is the cross sectional view corresponding to that of FIG. 8, showing a molding device 230. The cross sectional view shows a molding portion 232 for forming the connector port 218, a molding portion 234 for forming the connecting pipe portion 216, and molding portions 236 for forming the hollow nozzle portions 220. These molding portions 232, 234 and 236, which are parallel to each other, lie in one plane. The molding device 230 principally consists of a lower stationary mold 238 and an upper movable mold 240. The movable mold 240 is movable upwards and downwards away from and toward the stationary mold 238. That is, the direction in which the movable mold 240 is vertically movable (as seen in FIG. 13) is parallel to a direction of extension of the mutually parallel connecting pipe portion 216, connector port 218, and hollow nozzle portions 220. When the molding device 230 is placed in a closed state with the movable mold 240 being moved downwards as seen in FIG. 13, a mold cavity 242 having the molding portions 232, 234 and 236 is formed within the thus closed molding device 230. A molten resin material is injected into the mold cavity 242, and is then cooled and cured. As a result, the base divisional component 212 having the first and second A-grooves 110 and 112 is formed within the mold cavity 242, integrally with the connecting pipe portion 216 having the connecting passage portion 214, the cylindrical connector port 218 and the hollow nozzle portions 220. The base divisional component 212 may be subjected to a machining operation for its intricate shaping adjustment, as needed. For instance, the connecting pipe portion 216 may be subjected to a machining operation on its outer circumferential surface, to remove unnecessary stock or burrs. For instance, each of the delivery nozzles 222 of the nozzle portions 220 may be formed by the injection molding process to form the base divisional component 212, with a movement of a slidable mold, as in the first embodiment. However, the delivery nozzles 222 may be formed by a machining operation, for example, after the injection molding process.

In the present embodiment, the A-grooves 110 and 112 formed in the first and second interfacial surfaces 114*f* and 116*f* are open in the respective opposite directions parallel to the direction of extension of the connecting pipe portion 216. Although the first and second divisional components 102 and 104 may be pressed against the respective first and second half components 114 and 116 in the vibration welding process, in the direction of extension of the connecting pipe portion 216, the divisional components 102 and 104 are preferably pressed against the respective divisional components 114 and 116, in the leftward and rightward directions as seen in FIG. 12, that is, in opposite directions which are perpendicular or substantially perpendicular to the first and second interfacial surfaces 114*f* and 116*f*, as in the first and second embodiments.

While the preferred embodiments of the invention have been described for illustrative purpose only, it is to be understood that the present invention may be embodied with various changes and improvements, which may occur to those skilled in the art.

NOMENCLATURE OF ELEMENTS

12: transaxle (power transmitting system)
42: first oil supply passage (oil passage)
48: oil
62: bearings (lubricated portions)
64: gears (lubricated portions)
70, 200, 210: oil piping assembly (resin piping assembly)
76, 220: nozzle portions
78, 222: delivery nozzles
80: first passage portion
84: second passage portion
88, 214: connecting passage portion
90, 216: connecting pipe portion
92, 218: connector port
100, 212: base divisional component
102: first divisional component
102*f*: third interfacial surface
104: second divisional component
104*f*: fourth interfacial surface
110: first A-groove (groove)
112: second A-groove (groove)
114: first half component
114*f*: first interfacial surface
116: second half component
116*f*: second interfacial surface
130, 230: molding device
138, 238: stationary mold
140, 240: movable mold

What is claimed is:

1. A resin piping assembly having an oil passage, comprising:
    a base divisional component including a first half component having a first interfacial surface formed along the oil passage, and a second half component having a second interfacial surface formed along the oil passage;
    a first divisional component having a third interfacial surface formed along the oil passage, and bonded to the first half component with the first and third interfacial surfaces being held in contact with each other, so as to form a first passage portion of the oil passage; and
    a second divisional component having a fourth interfacial surface formed along the oil passage, and bonded to the second half component with the second and fourth interfacial surfaces being held in contact with each other, so as to form a second passage portion of the oil passage,
    each of the base divisional component, the first divisional component and the second divisional component being formed of a resin material,
    the first and second half components being spaced apart from each other along a length of the oil passage, and the first and second interfacial surfaces being open in respective opposite directions, and
    the base divisional component further including a cylindrical connecting pipe portion including a cylindrical outer surface and a connecting passage portion which is a part of the oil passage and which is provided for communication between the first and second passage portions.

2. The resin piping assembly according to claim 1, wherein:
    the first interfacial surface of the first half component has a groove at least partially defining the first passage portion, and the second interfacial surface of the second half component has a groove at least partially defining the second passage portion,
    the connecting pipe portion linearly extends along a straight line, and the first and second half components are spaced apart from each other in a direction parallel to the straight line, and
    the grooves of the first and second interfacial surfaces are open in respective opposite directions parallel to the straight line, and the first and second half components extend from the connecting pipe portion in respective opposite directions perpendicular to the straight line.

3. The resin piping assembly according to claim 1, wherein at least one of the base divisional component and the first and second divisional components is provided with a plurality of integrally formed hollow nozzle portions each extending in a direction opposite to a direction in which a groove formed in the interfacial surface of said at least one divisional component is open, each of the hollow nozzle portions having a delivery nozzle which is open externally of the hollow nozzle portion.

4. The resin piping assembly according to claim 3, wherein the connecting pipe portion linearly extends, and the base divisional component is provided with the hollow nozzle portions such that the hollow nozzle portions linearly extend parallel to a direction of extension of the cylindrical connecting pipe portion.

5. The resin piping assembly according to claim 1, wherein the connecting pipe portion linearly extends, and the first half component of the base divisional component is provided with an integrally formed cylindrical connector port such that the connector port linearly extends parallel to a direction of extension of the connecting pipe portion, in a direction opposite to a direction in which a groove formed in the first interfacial surface is open.

6. The resin piping assembly according to claim 1, which is configured to deliver a lubricant oil to predetermined lubricated portions of a power transmitting system.

* * * * *